(12) United States Patent
Takeda et al.

(10) Patent No.: US 11,533,691 B2
(45) Date of Patent: Dec. 20, 2022

(54) USER TERMINAL AND RADIO COMMUNICATION METHOD

(71) Applicant: NTT DOCOMO, INC., Tokyo (JP)

(72) Inventors: Daiki Takeda, Tokyo (JP); Satoshi Nagata, Tokyo (JP); Daisuke Murayama, Tokyo (JP); Hiroki Harada, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/649,569

(22) PCT Filed: Sep. 18, 2018

(86) PCT No.: PCT/JP2018/034528
§ 371 (c)(1),
(2) Date: Mar. 20, 2020

(87) PCT Pub. No.: WO2019/059196
PCT Pub. Date: Mar. 28, 2019

(65) Prior Publication Data
US 2020/0221404 A1    Jul. 9, 2020

(30) Foreign Application Priority Data

Sep. 20, 2017 (JP) ............................. JP2017-196411

(51) Int. Cl.
*H04W 56/00* (2009.01)
*H04W 72/00* (2009.01)
(Continued)

(52) U.S. Cl.
CPC ......... *H04W 56/001* (2013.01); *H04L 5/0094* (2013.01); *H04W 72/005* (2013.01); *H04W 72/042* (2013.01)

(58) Field of Classification Search
CPC ... H04W 28/04; H04W 72/04; H04W 72/042; H04W 88/08; H04L 5/0007
(Continued)

(56) References Cited

U.S. PATENT DOCUMENTS

2016/0112172 A1* 4/2016 Seo ........................ H04L 5/0053
370/329
2018/0242324 A1* 8/2018 Luo ..................... H04L 27/2617
(Continued)

FOREIGN PATENT DOCUMENTS

JP   WO2019059196 A1 *  3/2019   .......... H04W 72/005
WO  2017/018966 A1     2/2017
(Continued)

OTHER PUBLICATIONS

3GPP TSG RAN WG1 Meeting NR#3, Nagoya, Japan, Sep. 18-21, 2017, R1-1715376, Source: ZTE, Sanechips, Title: Remaining details on NR-SS, Agenda Item: 6.1.1. (Year: 2017).*
(Continued)

*Primary Examiner* — Peter G Solinsky
*Assistant Examiner* — Sanjay K Dewan
(74) *Attorney, Agent, or Firm* — Osha Bergman Watanabe & Burton LLP

(57) ABSTRACT

A terminal is disclosed including a receiver configured to receive a synchronization signal block (SS/PBCH block) including information that indicates a configuration of a control resource set; and a processor configured to determine a position of the control resource set relative to the SS/PBCH block based on the information. In other aspects, another terminal, a radio communication method for a terminal, and a base station are also disclosed.

20 Claims, 17 Drawing Sheets

240kHz SCS

| # | 0 | 1 | 2 | 3 | 4 | 5 | 6 | 7 | 8 | 9 | 10 | 11 | 12 | 13 | 14 | 15 |
|---|---|---|---|---|---|---|---|---|---|---|----|----|----|----|----|----|
| BIT | 00000 | 00001 | 00010 | 00011 | 00100 | 00101 | 00110 | 00111 | 01000 | 01001 | 01010 | 01011 | 01100 | 01101 | 01110 | 01111 |
| BANDWIDTH (BW) | 24PRB ||||||||||||| 48PRB |||
| DURATION | 2 OFDM SYMBOLS |||||| 3 OFDM SYMBOLS ||||||| 1 OFDM SYMBOL |||
| STARTING POSITION | S1 | S8 | S10 | S12 | S14 | S3 | S1 | S8 | S9 | S10 | S11 | S3 | S1 | S8 | S9 | S10 |
| FREQUENCY POSITION | F1 |||| F2 || F1 ||||| F2 | F3 |||

| # | 16 | 17 | 18 | 19 | 20 | 21 | 22 | 23 | 24 | 25 | 26 | 27 | 28 | 29 | 30 | |
|---|----|----|----|----|----|----|----|----|----|----|----|----|----|----|----|----|
| BIT | 10000 | 10001 | 10010 | 10011 | 10100 | 10101 | 10110 | 10111 | 11000 | 11001 | 11010 | 11011 | 11100 | 11101 | 11110 | |
| BANDWIDTH | 48PRB |||||||| 96PRB ||||||| |
| DURATION | 1OFDM SYMBOL | 2 OFDM SYMBOLS |||||| 1 OFDM SYMBOL |||||| | NULL |
| STARTING POSITION | S11 | S3 | S3 | S8 | S10 | S12 | S14 | S3 | S1 | S8 | S9 | S10 | S11 | S3 | | |
| FREQUENCY POSITION | F3 | F2 | F3 |||| F2 | F3 ||||| F2 | | |

(51) Int. Cl.
*H04W 72/04* (2009.01)
*H04L 5/00* (2006.01)

(58) Field of Classification Search
USPC .......................................................... 370/329
See application file for complete search history.

(56) References Cited

U.S. PATENT DOCUMENTS

| | | | | |
|---|---|---|---|---|
| 2018/0248642 A1* | 8/2018 | Si | ........................ | H04L 5/0092 |
| 2018/0262308 A1* | 9/2018 | Si | ........................ | H04L 5/0048 |
| 2018/0279241 A1* | 9/2018 | Lee | ..................... | H04W 56/001 |
| 2019/0149213 A1* | 5/2019 | Zhou | ..................... | H04L 5/0007 |
| | | | | 370/329 |
| 2019/0149383 A1* | 5/2019 | Ko | ....................... | H04J 11/0069 |
| | | | | 370/329 |
| 2019/0150068 A1* | 5/2019 | Montojo | ............... | H04W 48/12 |
| | | | | 370/329 |
| 2019/0150121 A1* | 5/2019 | Abdoli | .................. | H04L 5/0092 |
| | | | | 370/329 |
| 2020/0029238 A1* | 1/2020 | Si | ........................ | H04W 76/27 |
| 2020/0214014 A1* | 7/2020 | Wang | ................. | H04W 72/0493 |
| 2022/0141877 A1* | 5/2022 | Ko | ..................... | H04W 74/0833 |
| | | | | 370/329 |

FOREIGN PATENT DOCUMENTS

| | | | | | |
|---|---|---|---|---|---|
| WO | WO-2017018966 A1 * | 2/2017 | | ............... | H04W 4/00 |
| WO | WO-2018084636 A1 * | 5/2018 | | ............... | H04J 11/00 |
| WO | WO-2018106075 A1 * | 6/2018 | | ............... | H04J 11/10 |
| WO | WO-2018129319 A1 * | 7/2018 | | ............... | H04L 5/00 |
| WO | WO-2018155987 A2 * | 8/2018 | | ............... | H04L 5/00 |
| WO | WO-2018175840 A1 * | 9/2018 | | ............... | H04B 7/06 |

OTHER PUBLICATIONS

3GPP TSG RAN WG1 Meeting NR #3, Nagoya, Japan, Sep. 18-21, 2017, R1-1716070, Source: NTT Docomo, Inc., Title: Discussion on remaining details on NR-PBCH and PBCH-DMRS, Agenda Item: 6.1.2.1 (Year: 2017).*

3GPP TSG RAN WG1 Meeting NR #3, Nagoya, Japan, Sep. 18-21, 2017, R1-1716071, Source: NTT Docomo, Inc., Title: Discussion on remaining details on RMSI delivery, Agenda Item: 6.1.2.2. (Year: 2017).*

3GPP TSG RAN WG1 NR Ad-Hoc#2, Qingdao, P.R. China, Jun. 27-30, 2017, R1-1710078, Agenda item: 5.1.3.1.2.3, Source: CATT, Title: Discussion on multi-beam operation for NR-PDCCH. (Year: 2017).*

3GPP TSG RAN WG1 Meeting #90, Prague, Czech Republic, Aug. 21-25, 2017, R1-1714410, Agenda item: 6.1.3.1.2.1, Source: Ericsson, Title: On Configuration of Control Resource Sets. (Year: 2017).*

3GPP TSG RAN WG1 Meeting #89, Hangzhou, China, May 15-19, 2017, R1-1706943, Source: Huawei, HiSilicon, Title: Configuration of Control resource set. (Year: 2017).*

3GPP TSG RAN WG1 Meeting NR#3, Nagoya, Japan, Sep. 18-21, 2017, R1-1716475, Agenda item: 6.3.1.2, Source: InterDigital Communications, Title: Remaining issues related to CORESET configuration. (Year: 2017).*

Extended European Search Report in counterpart European Application No. 18858259.7 dated Mar. 16, 2021 (21 pages).

InterDigital Communication; "Remaining issues related to CORESET configuration"; 3GPP TSG RAN WG1 Meeting NR#3, R1-1716475; Nagoya, Japan; Sep. 18-21, 2017 (5 pages).

H. Huawei; "Configuration of control resource set"; 3GPP TSG RAN WG1 Meeting #89, R1-1706943; Hangzhou, China; May 15-19, 2017 (4 pages).

CATT; "PDCCH search space design"; 3GPP TSG RAN WG1 Meeting AH_#NR3, R1-1715813; Nagoya, Japan; Sep. 18-21, 2017 (10 pages).

Samsung "Remaining details on remaining minimum system information delivery"; 3GPP TSG RAN WG1 Meeting NR#3, R1-1715910; Nagoya, Japan; Sep. 18-21, 2017 (5 pages).

CATT; "Discussion on multi-beam operation for NR-PDCCH"; 3GPP TSG RAN WG1 NR Ad-Hoc#2, R1-1710078; Qingdao, P. R. China; Jun. 27-30, 2017 (5 pages).

H. Huawei; "CORESET configuration and search space design"; 3GPP TSG RAN WG1 Meeting AH_NR#3, R1-1715395; Nagoya, Japan; Sep. 18-21, 2017 (10 pages).

International Search Report issued in Application No. PCT/JP2018/034528, dated Nov. 13, 2018 (4 pages).

Written Opinion issued in International Application No. PCT/JP2018/034528, dated Nov. 13, 2018 (9 pages).

3GPP TS 36.300 V8.12.0, Release 8; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2;" Mar. 2010; Sophia Antipolis Valbonne, France (149 pages).

3GPP TSG RAN WG1 Meeting NR#3; R1-1716071; "Discussion on remaining details on RMSI delivery;" NTT Docomo, Inc.; Sep. 18-21, 2017; Nagoya, Japan (7 pages).

3GPP TSG RAN WG1 Meeting NR#3; R1-1716070; "Discussion on remaining details on NR-PBCH and PBCH-DMRS;" NTT Docomo, Inc.; Sep. 18-21, 2017; Nagoya, Japan (15 pages).

3GPP TSG RAN WG1 Meeting NR#3; R1-1715376; "Remaining details of NR-SS;" ZTE Sanechips; Sep. 18-21, 2017; Nagoya, Japan (12 pages).

3GPP TSG-RAN WG1 Meeting #90; R1-1714410; "On Configuration of Control Resource Sets;" Samsung; Aug. 21-25, 2017; Prague, Czech Republic (6 pages).

Office Action in counterpart Russian Patent Application No. 2020113216 dated Feb. 21, 2022 (16 pages).

Office Action in counterpart Indian Patent Application No. 202037016720 dated Feb. 25, 2022 (9 pages).

Office Action issued in the counterpart Taiwanese Patent Application No. 107133089, dated Jan. 12, 2022 (14 pages).

Office Action in counterpart Egyptian Patent Application No. 2020030503 dated May 15, 2022 (6 pages).

Office Action in counterpart Japanese Patent Application No. 2019-543651 dated Jun. 7, 2022 (6 pages).

* cited by examiner

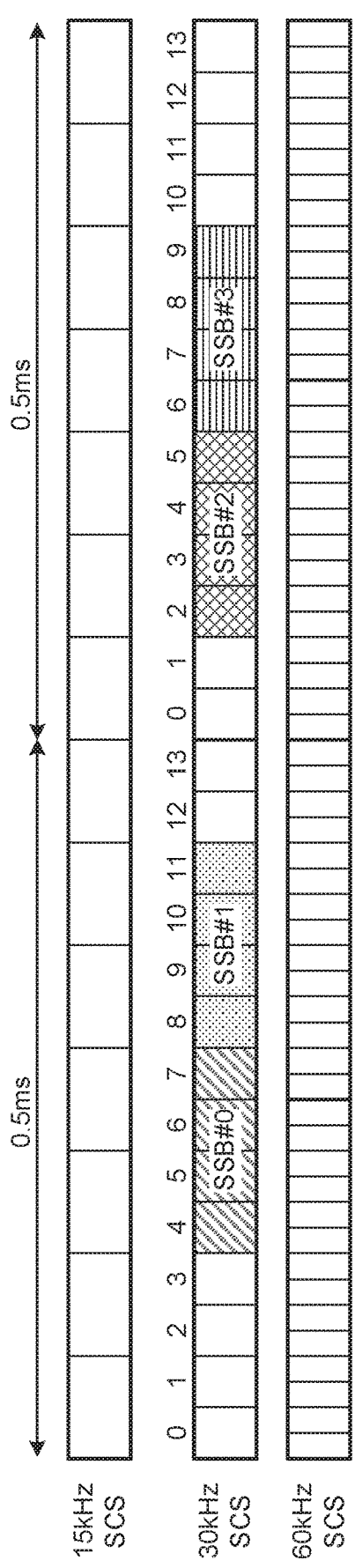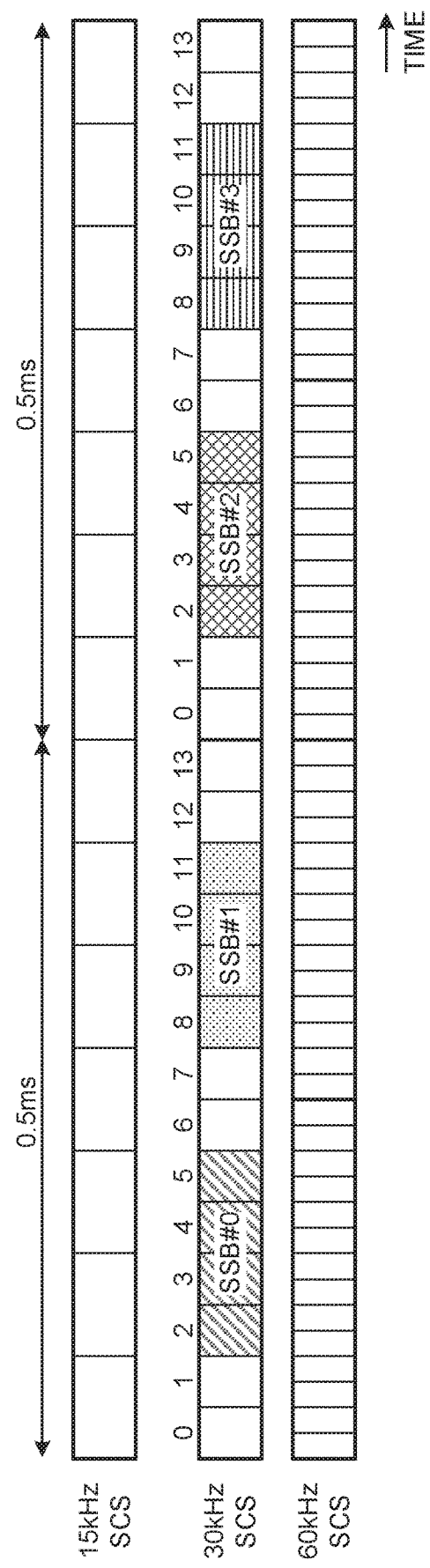

FIG. 6

240kHz SCS

| # | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| BIT | 0000 | 0001 | 0010 | 0011 | 0100 | 0101 | 0110 | 0111 | 1000 | 1001 | 1010 | 1011 | 1100 | 1101 | 1110 | 1111 |
| BANDWIDTH (BW) | 24PRB | | | | | | | | | | | | 48PRB | | | |
| DURATION | 2 OFDM SYMBOLS | | | | | | 3 OFDM SYMBOLS | | | | | | 1 OFDM SYMBOL | | | |
| STARTING POSITION | S1 | S8 | S10 | S12 | S14 | S3 | S1 | S8 | S9 | S10 | S11 | S3 | S1 | S8 | S9 | S10 |
| FREQUENCY POSITION | F1 | | | | | F2 | | | F1 | | | F2 | | | F3 | |

| # | 16 | 17 | 18 | 19 | 20 | 21 | 22 | 23 | 24 | 25 | 26 | 27 | 28 | 29 | 30 |
|---|---|---|---|---|---|---|---|---|---|---|---|---|---|---|---|
| BIT | 10000 | 10001 | 10010 | 10011 | 10100 | 10101 | 10110 | 10111 | 11000 | 11001 | 11010 | 11011 | 11100 | 11101 | 11110 |
| BANDWIDTH (BW) | 48PRB | | | | | | | | 96PRB | | | | | | NULL |
| DURATION | 1 OFDM SYMBOL | 2 OFDM SYMBOLS | | | | | | | 1 OFDM SYMBOL | | | | | | |
| STARTING POSITION | S11 | S3 | S3 | S8 | S10 | S12 | S14 | S3 | S1 | S8 | S9 | S10 | S11 | S3 | |
| FREQUENCY POSITION | F3 | F2 | | | F3 | | | F2 | | | F3 | | | F2 | |

FIG. 7

240kHz SCS

| # | 0 | 1 | 2 | 3 | 4 | 5 | 6 | 7 | 8 | 9 | 10 | 11 | 12 | 13 | 14 | 15 |
|---|---|---|---|---|---|---|---|---|---|---|----|----|----|----|----|----|
| BIT | 0000 | 0001 | 0010 | 0011 | 0100 | 0101 | 0110 | 0111 | 1000 | 1001 | 1010 | 1011 | 1100 | 1101 | 1110 | 1111 |
| BANDWIDTH (BW) | 24PRB | | | | | | 48PRB | | | | | | 96PRB | | | NULL |
| DURATION | 2 OFDM SYMBOLS | | | 3 OFDM SYMBOLS | | | 1 OFDM SYMBOL | | | | 2 OFDM SYMBOLS | | 1 OFDM SYMBOL | | | |
| STARTING POSITION | S1 | S8 | S10 | S3 | S3 | S2 | S1 | S8 | S9 | S3 | S3 | S1 | S8 | S9 | S3 | |
| FREQUENCY POSITION | F1 | | | | F2 | | | F3 | | F2 | | | F3 | | F2 | |

FIG. 8

240kHz SCS

| # | 0 | 1 | 2 | 3 | 4 | 5 | 6 | 7 | 8 | 9 | 10 | 11 | 12 | 13 | 14 | 15 |
|---|---|---|---|---|---|---|---|---|---|---|----|----|----|----|----|----|
| BIT | 0000 | 0001 | 0010 | 0011 | 0100 | 0101 | 0110 | 0111 | 1000 | 1001 | 1010 | 1011 | 1100 | 1101 | 1110 | 1111 |
| BANDWIDTH (BW) | 24PRB | | | | | | | | 48PRB | | | | 96PRB | | | NULL |
| DURATION | 2 OFDM SYMBOLS | | | 3 OFDM SYMBOLS | | | 1 OFDM SYMBOL | | 2 OFDM SYMBOLS | | | | 1 OFDM SYMBOL | | | |
| STARTING POSITION | S1 | SZ | S3 | S1 | SZ | S3 | S1 | SZ | S3 | S1 | SZ | S3 | S1 | SZ | S3 | |
| FREQUENCY POSITION | F1 | F2 | F3 | F1 | F2 | F3 | F2 | F3 | F2 | F3 | F2 | F3 | F3 | F2 | | |

FIG. 9A

6 GHz OR ABOVE

| # | 0 | 1 | 2 | 3 | 4 | 5 | 6 | 7 |
|---|---|---|---|---|---|---|---|---|
| BIT | 000 | 001 | 010 | 011 | 100 | 101 | 110 | 111 |
| BANDWIDTH (BW) | 24PRB | | 48PRB | | 96PRB | | 154PRB | |
| DURATION (OF DM SYMBOL) | 2 | 3 | 1 | 2 | 1 | 2 | 1 | 2 |

FIG. 9B

6 GHz OR ABOVE

| # | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| BIT | 0000 | 0001 | 0010 | 0011 | 0100 | 0101 | 0110 | 0111 | 1000 | 1001 | 1010 | 1011 | 1100 | 1101 | 1110 | 1111 |
| STARTING POSITION | SB14 | SB12 | SB10 | SB8 | SB6 | SB4 | SB2 | ST1 | ST3 | SN1 | SA3 | SA5 | SA7 | SA9 | SA11 | SA13 |

FIG. 10

6 GHz OR ABOVE

| # | 0 | 1 | 2 | 3 | 4 | 5 | 6 | 7 | 8 | 9 | 10 | 11 | 12 | 13 | 14 | 15 |
|---|---|---|---|---|---|---|---|---|---|---|----|----|----|----|----|----|
| BIT | 00000 | 00001 | 00010 | 00011 | 00100 | 00101 | 00110 | 00111 | 01000 | 01001 | 01010 | 01011 | 01100 | 01101 | 01110 | 01111 |
| FREQUENCY POSITION (CENTERED ON BW) | F | F+12 | F+24 | F+36 | F+48 | F+60 | F+72 | F+84 | F+96 | F+108 | F+120 | F+132 | F+144 | F+156 | F+168 | F+180 |

| # | 16 | 17 | 18 | 19 | 20 | 21 | 22 | 23 | 24 | 25 | 26 | 27 | 28 | 29 | 30 | 30 |
|---|----|----|----|----|----|----|----|----|----|----|----|----|----|----|----|----|
| BIT | 10000 | 10001 | 10010 | 10011 | 10100 | 10101 | 10110 | 10111 | 11000 | 11001 | 11010 | 11011 | 11100 | 11101 | 11110 | 11111 |
| FREQUENCY POSITION (CENTERED ON BW) | F-12 | F-24 | F-36 | F-48 | F-60 | F-72 | F-84 | F-96 | F-108 | F-120 | F-132 | F-144 | F-156 | F-168 | F-180 | NULL |

USER TERMINAL AND RADIO COMMUNICATION METHOD

TECHNICAL FIELD

The present invention relates to a user terminal and a radio communication method in next-generation mobile communication systems.

BACKGROUND ART

In the UMTS (Universal Mobile Telecommunications System) network, the specifications of long term evolution (LTE) have been drafted for the purpose of further increasing high speed data rates, providing lower latency and so on (see non-patent literature 1). In addition, LTE-A (LTE advanced and LTE Rels. 10, 11, 12 and 13) has been standardized for the purpose of achieving increased capacity and enhancement beyond LTE (LTE Rels. 8 and 9).

Successor systems of LTE are also under study (for example, referred to as "FRA (Future Radio Access)," "5G (5th generation mobile communication system)," "5G+ (plus)," "NR (New Radio)," "NX (New radio access)," "FX (Future generation radio access)," "LTE Rel. 14 or 15 and later versions," and so forth).

In existing LTE systems (for example, LTE Rels. 8 to 13), a user terminal (UE (User Equipment)) establishes synchronization with a network (for example, a base station (eNB: eNode B)) by detecting synchronization signals (PSS (Primary Synchronization Signal) and/or SSS (Secondary Synchronization Signal)), following initial access procedures (also referred to as "cell search," for example), and, furthermore, identifies the cells to connect to (which are identified based on, for example, cell IDs (IDentifiers)).

Also, after the cell search, the UE receives the master information block (MIB), which is transmitted in a broadcast channel (PBCH (Physical Broadcast CHannel)), system information blocks (SIBs), which are transmitted in a downlink (DL) shared channel (PDSCH (Physical Downlink Shared CHannel)), and/or others, and acquires configuration information (which may be referred to as "broadcast information," "system information," and so forth) for communicating with the network.

CITATION LIST

Non-Patent Literature

Non-Patent Literature 1: 3GPP TS 36.300 "Evolved Universal Terrestrial Radio Access (E-UTRA) and Evolved Universal Terrestrial Radio Access Network (E-UTRAN); Overall Description; Stage 2"

SUMMARY OF INVENTION

Technical Problem

Envisaging future radio communication systems (for example, NR or 5G), a study is underway to define a resource unit that contains synchronization signals and a broadcast channel, as a synchronization signal block, and to gain initial access based on this SS block. The synchronization signals are also referred to as "PSS and/or SSS," "NR-PSS and/or NR-SSS," and so forth. The broadcast channel is also referred to as "PBCH," "NR-PBCH," and so forth. The synchronization signal block is also referred to as an "SS block," "SS/PBCH block," and so forth.

In initial access using an SS block, for example, information about the field where a downlink control channel is provided is indicated to UE by using the NR-PBCH constituting the SS block. The field where the downlink control channel (NR-PDCCH) is provided is referred to as a "control resource set (CORESET)," a "control subband," a "search space set," a "search space resource set," a "control field," a "control subband," an "NR-PDCCH field," and so on.

However, there are no fixed rules as to how the information (also referred to as "CORESET configuration," for example) related to the field to provide a downlink control channel should be placed in the NR-PBCH and indicated to UE, and so an appropriate indicating method is in demand.

The present invention has been made in view of the above, and it is therefore an object of the present invention to provide a user terminal and a radio communication method, whereby information about the field where a control channel is provided can be indicated adequately in a radio communication system where synchronization signal blocks are used.

Solution to Problem

A user terminal according to one aspect of the present invention has a receiving section that receives a synchronization signal block (SS/PBCH block), which includes predetermined information representing a configuration of a control resource set, and a control section that determines a relative position of the control resource set with respect to the SS/PBCH block based on the predetermined information.

Advantageous Effects of Invention

According to the present invention, information about the field where a control channel is provided can be indicated adequately in a radio communication system where synchronization signal blocks are used.

BRIEF DESCRIPTION OF DRAWINGS

FIGS. 3A and 3B are diagrams to show other examples of SS burst set compositions;

FIG. 6 is a diagram to show another example of a table in which control resource set configurations are set forth;

FIG. 7 is a diagram to show another example of a table in which control resource set configurations are set forth;

FIG. 8 is a diagram to show another example of a table in which control resource set configurations are set forth;

FIGS. 9A and 9B are diagrams to show other examples of tables in which control resource set configurations are set forth;

FIG. 10 is a diagram to show another example of a table in which control resource set configurations are set forth;

DESCRIPTION OF EMBODIMENTS

Envisaging future radio communication systems (for example, LTE Rel. 14 or later versions, 5G or NR, and so forth), a study is underway to define a signal block (also referred to as "SS/PBCH block," and so forth) that contains synchronization signals (also referred to as "SS," "PSS and/or SSS," "NR-PSS and/or NR-SSS," and so forth) and a broadcast channel (also referred to as "broadcast signal," "PBCH," "NR-PBCH," and so forth). A set of one or more signal blocks is also referred to as a "signal burst ("SS/PBCH burst" or "SS burst")." Multiple signal blocks within a signal burst are transmitted in different beams at different times (also referred to as "beam sweep," and/or the like).

An SS/PBCH block is formed with one or more symbols (for example, OFDM symbols). To be more specific, an SS/PBCH block may be comprised of a plurality of consecutive symbols. In this SS/PBCH block, PSS, SSS and NR-PBCH may be each arranged in one or more different symbols. For example, regarding SS/PBCH blocks, a study is in progress to form an SS/PBCH block with four symbols or five symbols, including a PSS of one symbol, an SSS of one symbol, and a PBCH of two or three symbols.

A set of one or more SS/PBCH blocks may be referred to as an "SS/PBCH burst." For example, an SS/PBCH burst may be formed with SS/PBCH blocks of consecutive frequency and/or time resources, or may be formed with SS/PBCH blocks of non-consecutive frequency and/or time resources. SS/PBCH bursts may be provided in a predetermined cycle (this cycle may be referred to as "SS/PBCH burst periodicity"), or may be provided aperiodically.

Also, one or more SS/PBCH bursts may be referred to as an "SS/PBCH burst set (SS/PBCH burst series)." SS/PBCH burst sets are provided periodically. A user terminal may control the receiving process (reception process) on assumption that SS/PBCH burst sets are transmitted periodically (in an SS/PBCH burst set periodicity (SS burst set periodicity)).

Figure 1A:
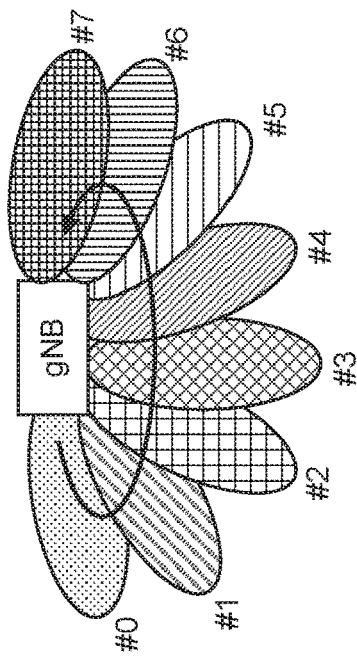
FIGS. 1A and 1B provide diagrams to show examples of SS block configurations.
Figure 1B:
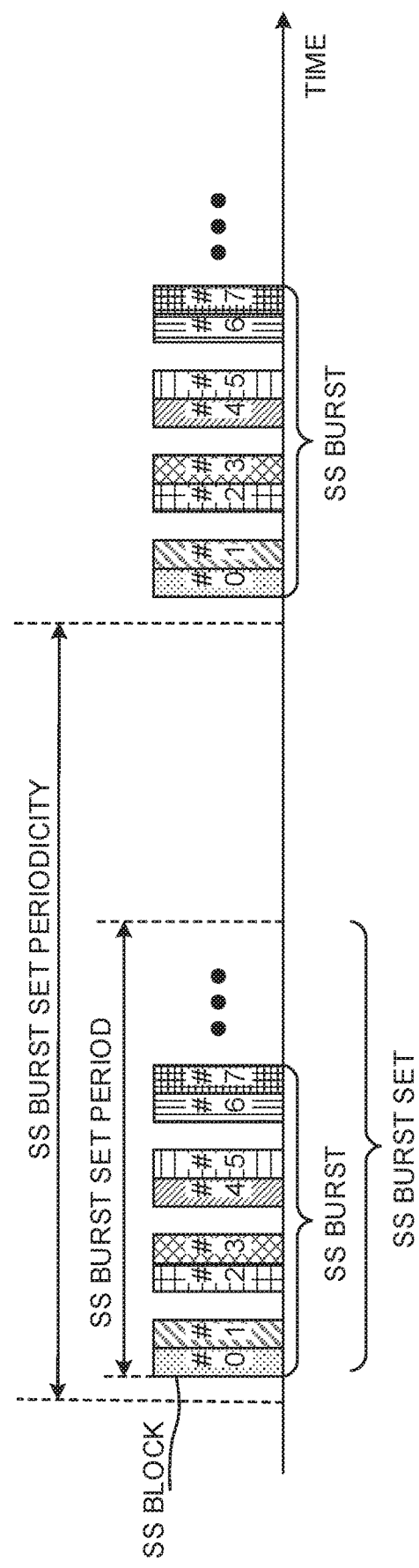

FIGS. 1A and 1B provide diagrams to show examples of SS burst sets. FIG. 1A shows an example of beam sweeping. As shown in FIGS. 1A and 1B, a radio base station (gNB) may change the directivity of beams over time (beam sweeping), and transmit different SS blocks by using different beams. Note that, although FIGS. 1A and 1B show examples of using multiple beams, it is also possible to transmit SS blocks by using a single beam.

As shown in FIG. 1B, an SS burst is formed with one or more SS blocks, and an SS burst set is formed with one or more SS bursts. For example, in FIG. 1B, an SS burst is formed with eight SS blocks #0 to #7, but this is by no means limiting. SS blocks #0 to #7 may be transmitted in different beams #0 to #7 (FIG. 1A), respectively.

As shown in FIG. 1B, an SS burst set to include SS blocks #0 to #7 may be transmitted so as not to exceed a predetermined period (which is, for example, 5 ms or shorter, and also referred to as "SS burst set period," and/or the like). Also, an SS burst set may be repeated in a predetermined cycle (which is, for example, 5, 10, 20, 40, 80 or 160 ms, and also referred to as "SS burst set periodicity," and/or the like).

Note that, in FIG. 1B, predetermined time intervals are provided between SS blocks #1 and #2, between SS blocks #3 and #4, and between SS blocks #5 and #6, but these time intervals may not be necessary, or may be provided between other SS blocks (for example, between SS blocks #2 and #3, between SS blocks #5 and #6, and so on). In these time intervals, for example, a DL control channel (also referred to as "PDCCH (Physical Downlink Control CHannel)," "NR-PDCCH," "downlink control information (DCI)," and so on) may be transmitted, and/or a UL control channel (PUCCH (Physical Uplink Control CHannel)) may be transmitted from a user terminal. For example, when each SS block is formed with four symbols, a slot of fourteen symbols may contain an NR-PDCCH of two symbols, two SS blocks, an NR-PUCCH of two symbols, and a guard time.

Also, the index of each SS block is indicated using the NR-PBCH (or DMRS for NR-PBCH) contained in the SS block. The UE can identify the index of each SS block that is received, based on the NR-PBCH (or the DMRS for the NR-PBCH).

Also, a study is in progress to allow a base station to indicate, to UE, information about the field where a downlink control channel (NR-PDCCH) is provided, by using the NR-PBCH. The information about the field where the NR-PDCCH is provided may be referred to as "control resource set configurations (CORESET configurations)," "NR-PDCCH configurations," and so forth.

In addition, research is underway to allow a base station to schedule system information (for example, RMSI (Remaining Minimum System Information)) by using the NR-PDCCH. In this case, based on the control resource set configurations indicated in the NR-PBCH, the UE receives the NR-PDCCH, and, by receiving the NR-PDSCH that is scheduled by this NR-PDCCH, acquires system information.

Meanwhile, what content is included and indicated in the NR-PBCH is not specifically fixed, and the problem has to do with how to configure and indicate the specifics of the method of indicating control resource set configurations (such as the number of bits, content, and so on) to the UE.

Resources that can be applied to NR-PBCH are limited, so that, with the NR-PBCH, it is desirable to reduce the payload to the minimum necessary, improve the rate of detection by increasing the redundancy, and, furthermore, reduce the range and/or the granularity in which NR-PDCCH configurations are provided. In particular, when the frequency band is low (for example, lower than 6 GHz), the number of beams to use is smaller than when the frequency band is high, so that it is desirable to fulfill the above conditions.

Also, considering that multiple beams are used in a high frequency band (for example, 6 GHz or above), it is desirable to provide NR-PDCCH configurations in a wide range and/or with fine granularity. For example, it is possible to configure a common set of control resources using NR-PBCHs of different frequency bands and/or different transmission timings.

In this way, when indicating control resource set configurations using NR-PBCHs contained in SS/PBCH blocks, it is desirable to exert control so that at least one of the following conditions is fulfilled:

the number of bits that are used to indicate the control resource set configurations in frequency bands below a predetermined frequency (for example, 6 GHz) is reduced;

flexible configurations are applied taking into account the compatibility with multiple beams in the frequency band of the predetermined frequency (for example, 6 GHz) or in higher frequency bands; and control resource set configurations are indicated depending on how SS burst sets are arranged.

The contents (parameters) of control resource set configurations to be indicated using the NR-PBCH include the bandwidth (BW), the duration (for example, the number of symbols), the start timing and the frequency position of the control resource set. At least one item of these contents is indicated using the bit information that is included in the NR-PBCH.

When indicating some or all of the bandwidth, the duration, the start timing and the frequency position of a control resource set, it may be possible to define a table, in which the bit information to be included in the NR-PBCH and the contents of control resource set configurations are associated with one another. Based on the bit information included in the NR-PBCH and the table provided in advance, the UE can identify the control resource set configurations and receive the downlink control channel that is transmitted in the control resource set.

For example, it may be possible to define one table, in which control resource set configurations, corresponding to pieces of bit information to be included in the NR-PBCH, are laid out. In this case, regardless of what subcarrier spacing (SCS) and/or frequency band are used to transmit SS blocks, control resource set configurations can be indicated, in predetermined bits, by using one common table.

However, in future radio communication systems, SS burst sets may be arranged differently depending on what subcarrier spacing (SCS) is used to transmit SS/PBCH blocks.

Referring to FIG. 2 to FIGS. 4A and 4B, the SS burst set composition to be applied to each subcarrier spacing (here, SCS=15 kHz, 30 kHz, 120 kHz, 240 kHz, etc.) will be described.

Figure 2:
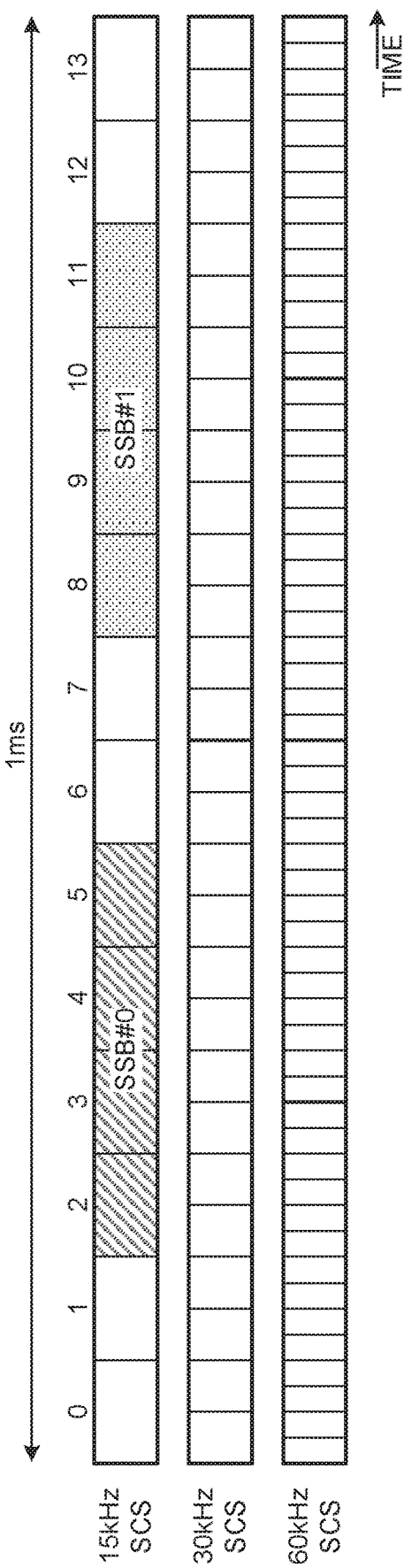
FIG. 2 is a diagram to show examples of SS burst set compositions.

FIG. 2 shows an example of the SS burst set composition for use when the subcarrier spacing is 15 kHz. In this case, two SS blocks (here, SSB #0 and SSB #1) are allocated in one slot (for example, 1 ms). In the composition shown in FIG. 2, for example, the frequency band used is 0 to 3 GHz, and the number of candidate SS block positions in an SS burst set is configured to four. Alternatively, the frequency band used is 3 to 6 GHz, and the number of candidate SS block positions in an SS burst set is configured to eight. The frequency band that can be used and the number of candidate SS block positions are not limited to these.

FIGS. 3A and 3B show examples of SS burst set compositions for use when the subcarrier spacing is 30 kHz. In this case, two SS blocks (here, SSB #0 and SSB #1 or SSB #2 and SSB #3) are allocated in one slot (for example, 0.5 ms). Note that, in one slot, SS blocks may be arranged consecutively (see FIG. 3A) or non-consecutively (see FIG. 3B). In the compositions shown in FIG. 3, for example, the frequency band used is 0 to 3 GHz, and the number of candidate SS block positions in an SS burst set is configured to four. Alternatively, the frequency band used is 3 to 6 GHz, and the number of candidate SS block positions in an SS burst set is configured to eight. The frequency band that can be used and the number of candidate SS block positions are not limited to these.

Figure 4A:
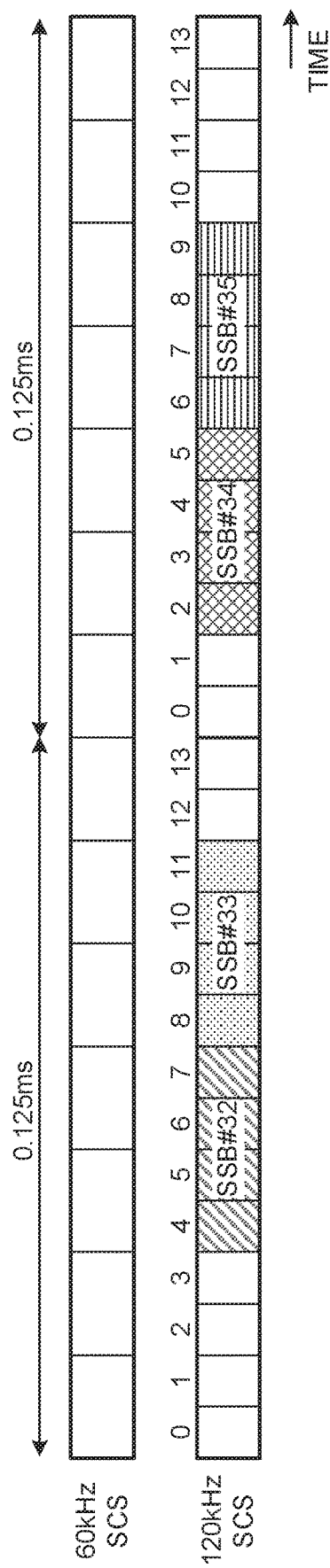
FIGS. 4A and 4B are diagrams to show other examples of SS burst set compositions.

FIG. 4A show an example of the SS burst set composition for use when the subcarrier spacing is 120 kHz. In this case, two SS blocks (here, SSB #32 and SSB #33, or SSB #34 and SSB #35) are allocated in one slot (for example, 0.125 ms). In the composition shown in FIG. 4A, for example, the frequency band used is 6 to 52.6 GHz, and the number of candidate SS block positions in an SS burst set is configured to 64. The frequency band that can be used and the number of candidate SS block positions are not limited to these.

Figure 4B:
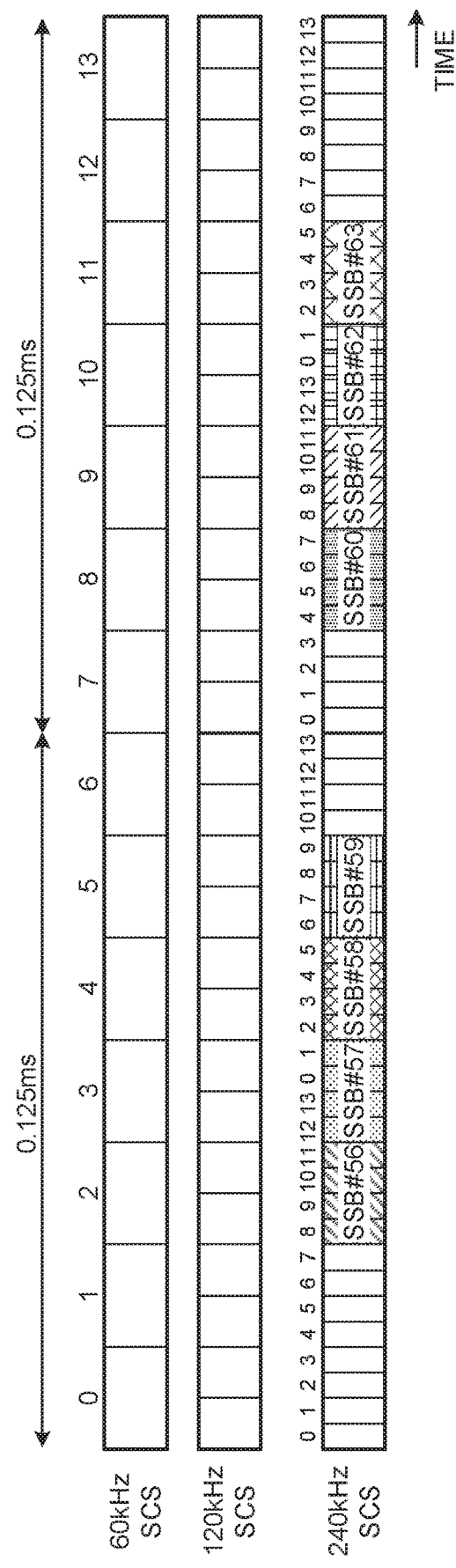

FIG. 4B shows an example of the SS burst set composition for use when the subcarrier spacing is 240 kHz. In this case, four consecutive SS blocks (here, SSB #56 to #59, or SSB #60 #63) are allocated in one slot (for example, 0.125 ms (24 OFDM symbols)). In the composition shown in FIG. 4B, for example, the frequency band used is 6 to 52.6 GHz, and the number of candidate SS block positions in an SS burst set is configured to 64. The frequency band that can be used and the number of candidate SS block positions are not limited to these.

Thus, even when SS blocks are transmitted by using multiple subcarrier spacings, the SS burst set composition changes only when the subcarrier spacing is 240 kHz. To be more specific, in the event the subcarrier spacing is 15 kHz, 30 kHz, 120 kHz and so on, one slot contains two SS blocks, and no composition is used in which at least three or more consecutive SS blocks are arranged. By contrast with this, when the subcarrier spacing is 240 kHz, a composition is used in which four consecutive SS blocks are arranged.

Therefore, if the above-mentioned table is defined based on burst sets that are for use when the SCS is 15 kHz, 30 kHz, 120 kHz and so on, it is difficult to apply this table to the SCS of 240 kHz on an as-is basis. For example, when a composition in which control resource sets are arranged in fields that are adjacent to SS blocks (for example, in the same frequency position) is defined in the table, there is a possibility that control resource sets or SS blocks and control resource sets collide with each other when the SCS is 240 kHz and four SS blocks continue. Meanwhile, if a common table is designed by taking into the account burst sets for all SCSs, control resource set configurations may not be configured flexibly.

Also, when indicating positions pertaining to a control resource set (for example, the start position), it may be possible to indicate specific symbols (for example, the symbol that is one symbol before an SS block). For example, it may be possible to define specific symbols, in advance, in a table corresponding to a predetermined number of bits, and indicate these symbols to the UE. However, when indicating the positions of control resource sets in this way by using a limited number of bits, it is difficult to indicate control resource set positions in a flexible way.

So, the present inventors have come up with the idea of configuring a number of variations (options) for positioning OFDM symbols for indicating control resource sets, depending on the positions of SS blocks. For example, based on multiple options (information to point forward in the time direction with respect to an SS block, information to point backward in the time direction, or other information), the positions of OFDM symbols in a control resource set are indicated by using the amounts of time shift based on relative positions with respect to the SS block. By this means, even when the NR-PBCH payload is limited, arrangement of control resource sets can be controlled in a flexible way.

Now, embodiments of the present invention will be described in detail below with reference to the accompanying drawings. Note that the configurations according to each embodiment may be applied individually or may be applied in combination. Furthermore, although cases will be illustrated with the following description where an SS block is formed with four symbols (an NR-PSS, an NR-SSS and two NR-PBCHs), the configuration of SS blocks is by no means limited to this.

(First Aspect)

The first aspect of the present invention is designed so that different control resource set configurations are indicated, per SS block (NR-PBCH), depending on what subcarrier spacing (SCS) is used to transmit SS blocks. A case will be described below where a common control resource set configuration is used when the SCS is 15 kHz, 30 kHz, 60 kHz and 120 kHz, and a different control resource set configuration is used for 240 kHz. However, the grouping of SCSs to use a common control resource set configuration is not limited to this combination.

For example, a common table (first table) may be defined, in which the bit information to be indicated in SS blocks where the SCS used is 15 kHz, 30 kHz, 60 kHz and 120 kHz (first SCS), and the control resource set configurations corresponding to the bit information are set forth. Meanwhile, a table (second table), in which the bit information to be indicated in SS blocks where the SCS used is 240 kHz (second SCS), and the control resource set configurations corresponding to the bit information are set forth, is configured apart from the first table.

To be more specific, the number of bits and/or the content that are used to indicate a control resource set configuration is configured differently when the first SCS is used and when the second SCS is used. Now, a case of using different numbers of bits to indicate control resource set configurations for the first SCS and the second SCS (configuration 1), and a case of indicating different contents by using a common number of bits (configuration 2) will be described below.

(Configuration 1)

For example, in an SS block where the first SCS is used, the control resource set configuration is indicated using four bits of bit information, whereas, in an SS block where the second SCS is used, the control resource set configuration is indicated using five bits of bit information. Note that it is only necessary to apply a large number of bits to the second SCS, at least compared to the first SCS, and the number of bits is not limited to these examples. By this means, when the second SCS is used, it is possible to indicate more control resource set configurations than when the first SCS is used, so that enough options can be reserved for a given SCS.

Figures 5A, 5B:
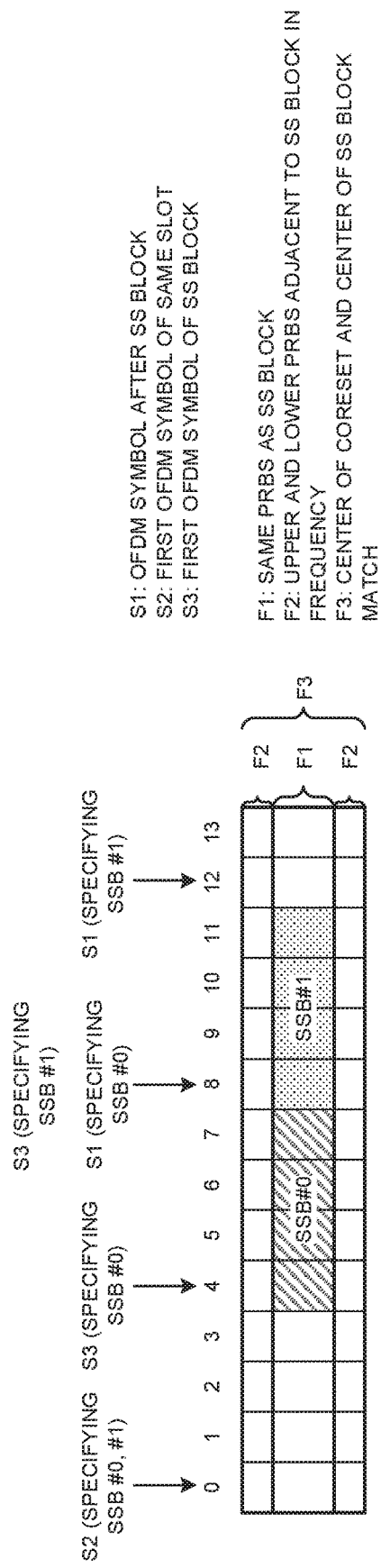
FIG. 5A shows an example of a table in which control resource set configurations are set forth.
FIG. 5B is a diagram to explain the start positions and frequency positions of control resource sets.

FIG. 5A shows an example of the first table in the event control resource set configurations are indicated using four bits of bit information. Here, a case is illustrated in which the bandwidth (BW), the duration (for example, the number of symbols), the start timing and the frequency position are set forth in the table as control resource set configurations.

In FIG. 5A, the bandwidth of control resource sets is defined to be 24 PRBs, 48 PRBs or 96 PRBs. In addition, the duration of control resource sets is defined to be one to three symbols. The start position of control resource sets is defined to be one of S1 to S3. The frequency position of control resource sets is defined to be one of F1 to F3.

Control resource set start positions S1 to S3 may be configured as follows (see FIG. 5B):

S1: The OFDM symbol after the SS block;
S2: The first OFDM symbol of the same slot as the SS block; and
S3: The first OFDM symbol of the SS block (the first OFDM symbol of the SS block).

Control resource set start positions F1 to F3 may be configured as follows (see FIG. 5B):

F1: The same PRBs as those of the SS block (the same PRBs as those occupied by the SS block);
F2: Upper and lower PRBs adjacent to the SS block in frequency (equal numbers of PRBs immediately below and above the SS block in frequency); and
F3: The center of CORESET and the center of the SS block match (the center of the CORESET BW is aligned with the center of the SS block).

Note that the contents to be set forth in the table (parameters, numerical values, etc.) are not limited to these.

FIG. 6 shows an example of the second table in the event control resource set configurations are indicated using five bits of bit information. Here, a case is illustrated in which the bandwidth (BW), the duration (for example, the number of symbols), the start timing and the frequency position are set forth in the table as control resource set configurations.

In FIG. 6, the bandwidth of control resource sets is defined to be 24 PRBs, 48 PRBs or 96 PRBs. In addition, the duration of control resource sets is defined to be one to three symbols. The start position of control resource sets is defined to be one of S1 to S3, and, in addition, S8, S9, S10, S11, S12 and S14. The frequency position of control resource sets is defined to be one of F1 to F3.

S8 to S14 each represent the number of OFDM symbols before the SS block. That is, "S8" indicates that the OFDM symbol that is located eight OFDM symbols before the SS block is the start position. Similarly, "S9" indicates that the OFDM symbol that is located nine OFDM symbols before the SS block is the start position.

In table 2, control resource set configurations are set forth in association with more bit information than in table 1. Referring to FIG. 6, control resource set start positions are defined in a larger number of patterns in table 2 than in table 1. Start positions are thus provided in greater detail, so that, even when four SS blocks continue, it is possible to configure the positions (for example, the start positions) of control resource sets, indicated in respective SS blocks, in a flexible way.

In this way, compared to the control resource set configurations for the first SCS, at least a large number of variations (patterns) of start positions are configured in control resource set configurations for the second SCS. Note that, as for other parameters (bandwidth, duration, frequency position, etc.), too, different contents (such as numerical values) may be set forth for the control resource set configurations for the first SCS and the control resource set configurations for the second SCS.

(Configuration 2)

For example, in SS blocks in which the first SCS is used and SS blocks in which the second SCS is used, different control resource set configurations may be indicated using four bits of bit information in each.

FIG. 7 shows an example of the second table (used in second SCS transmission) in the event control resource set configurations are indicated using four bits of bit information. Here, a case is illustrated in which the bandwidth (BW), the duration (for example, the number of symbols), the start timing and the frequency position are set forth in the table as control resource set configurations. Note that the first table used in first SCS transmission holds the same contents as in FIG. 5A.

In FIG. 7, the bandwidth of control resource sets is defined to be 24 PRBs, 48 PRBs or 96 PRBs. In addition, the duration of control resource sets is defined to be one to three symbols. The start position of control resource sets is defined to be one of S1 to S3, S8, S9, and S10. The frequency position of control resource sets is defined to be one of F1 to F3.

Control resource set start positions S1 to S3 or S8 to S10 may be configured as follows:

S1: The OFDM symbol after the SS block;
S2: The first OFDM symbol of the same slot as the SS block;
S3: The first OFDM symbol of the SS block;
S8: The OFDM symbol that is located eight OFDM symbols before the SS block;
S9: The OFDM symbol that is located nine OFDM symbols before the SS block; and
S10: The OFDM symbol located ten OFDM symbols before the SS block.

In this manner, when the first table and the second table are defined in association with the same bit information (for example, four bits), the start positions of SS blocks are defined in the second table in many variations (patterns). By this means, even when different SS burst sets (for example, different numbers of consecutive SS blocks) are configured between the first SCS and the second SCS, it is still possible to apply control resource set configurations, in a flexible manner, so as to suit each SS burst set.

Note that, although FIG. 7 shows a case where the number of symbols of SS blocks is specifically defined as the start position of control resource sets, this is by no means limiting. For example, the start position of a control resource set that is indicated in an SS block may be determined based on the SS block's index (see FIG. 8). Note that, in the event the table shown in FIG. 8 is used as the second table, the first table may have the same contents as in FIG. 5A.

In FIG. 8, the start position of control resource sets is defined to be one of S1, S3 and SZ. Here, SZ represents the OFDM symbol that is located Z OFDM symbols before the SS block, and Z is a value related to the SS block index. For example, Z may be a value that is determined from following equation 1, for example. Note that the modulo operation used in equation 1 below depends on the number of SS blocks that are continuous in a slot (here, four SS blocks), and can be changed as appropriate based on the SS burst set composition (for example, consecutive SS block configuration).

$$Z = 8 + S \times y \quad \text{(Equation 1)}$$

x: The SS block index
S: The duration of control resource set (the number of symbols)
y = x mod 4

In this way, by using a configuration to calculate the start position of control resources from the SS block index, it is possible to reduce the number of patterns of start positions to define in the second table (the number of variations of start positions defined). This makes it possible to reduce the bit values of bit information that is indicated in SS blocks transmitted by applying the second SCS (for example, the same bit values as when the first SCS is used), and, furthermore, control the start positions in a flexible way. Note that the first table may be defined for the first SCS too, so that the start positions can be calculated based on SS block indices.

(Second Aspect)

A case will be described below, based on a second aspect of the present invention, where a plurality of variations (options) of OFDM symbol positions for indicating control resource sets are configured depending on the positions of SS blocks, and indicated from a base station to UE. Note that the second aspect may be implemented alone, or may be implemented in combination with other aspects.

Although a case has been described above with reference to FIG. 8 where the amount of time shift from the SS block is configured as the start position of control resource sets, and where a time field (for example, a symbol) that is located ahead of the SS block is specified, the present embodiment is not limited to this. To indicate the start position of a control resource set based on the amount of time shift with respect to the SS block, not only a field that is located ahead of the SS block in the time direction, but also a field that is located behind the SS block, and/or a field that is located elsewhere (for example, a field in the SS block), may be indicated.

That is, multiple options for indicating positions (for example, symbol positions) pertaining to control resource sets are configured depending on where the SS block is positioned, and the positions of control resource sets, which schedule RMSI, are configured and indicated flexibly.

Now, a case will be described below where the position of an OFDM symbol in a control resource set is indicated by using the amount of time shift based on the relative position with respect to the SS block, by configuring multiple options.

In the following description, a specific symbol in the SS block, a symbol located ahead of the SS block, and a symbol located behind the SS block will be configured as multiple options for use when indicating the position of an OFDM symbol in a control resource set. Note that a symbol located ahead of an SS block and a symbols located behind an SS block indicate positions in the time direction with respect to an SS block. Obviously, the multiple options that can be used when indicating the position of an OFDM symbol in a control resource set are not limited to these.

For example, one of following SX, SY and S3 is indicated, from a base station to UE, as the start position of a control resource set. Obviously, the contents and variations to be indicated to the UE are not limited to these:

SX: The OFDM symbol located X OFDM symbols before the SS block;
SY: The OFDM symbol that is located Y OFDM symbols after the SS block; and
S3: The first OFDM symbol in the SS block.

X and Y each correspond to the amount of shift with respect to the SS block, and may have values determined based on predetermined parameters. For example, X and/or Y may be values determined by at least one of the subcarrier spacing, the configuration of the control resource set, the configuration of the SS block, and the frequency band.

For example, X and/or Y may be determined per subcarrier spacing that is used to transmit an SS block (or per configuration in which SS blocks continue). In this case, an equation to include the configuration of the control resource set (for example, the duration of the control resource set) and the configuration of the SS block (for example, the SS block index) may be defined for each subcarrier spacing.

For example, in subcarrier spacings (for example, the SCS of 15 kHz (for example, FIG. 2), 30 kHz (for example, FIG. 3B)) and so on, at which configurations with non-consecutive SS blocks are used, X and Y may be calculated from equation 2 and equation 3 below (see FIG. 11A). Note that FIGS. 11A to 11C show the case where the duration of the control resource set is 2.

$$X = 2 + (4 - \text{duration of control resource set}) \times (\text{SS block index mod} 1) \quad \text{(Equation 2)}$$

$$Y = 1 - (4 - \text{duration of control resource set}) \times (\text{SS block index mod} 1) \quad \text{(Equation 3)}$$

Figure 11A:
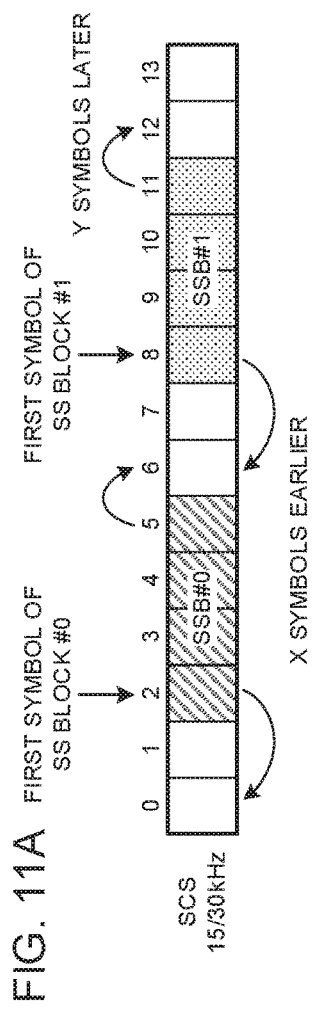
FIGS. 11A to 11C provide diagrams to show examples of methods of identifying the start positions of control resource sets.
Figure 11B:
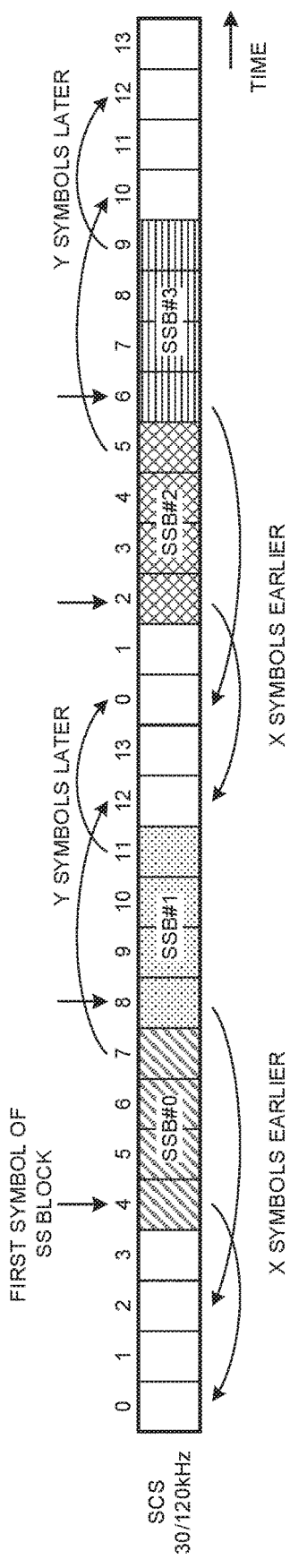
Figure 11C:
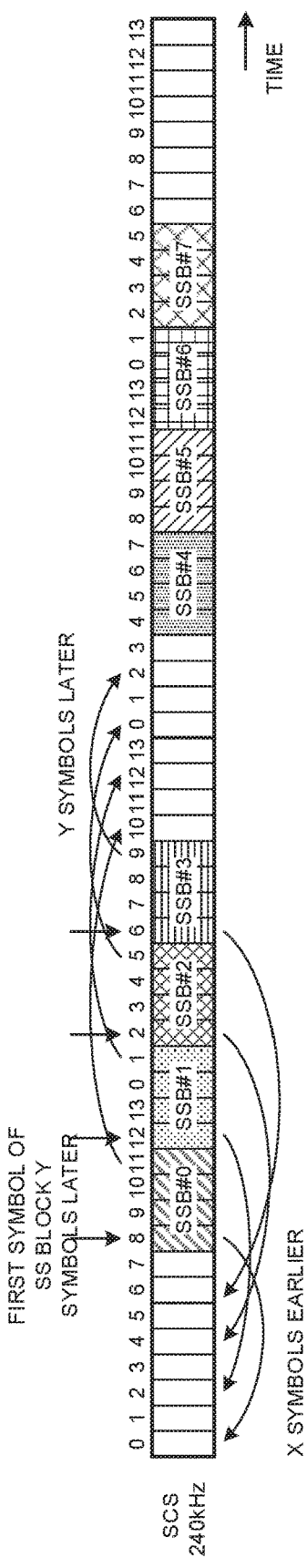

FIG. 11A shows a case where X=2 and Y=1. For example, if the UE receives SS block #0 and X or Y is indicated in the NR-PBCH contained in this SS block #0, the UE identifies the relative position from SS block #0 based on equation 2 or 3 above. Then, the receipt of RMSI is controlled on assumption that the control resource set is transmitted in that relative position with respect to SS block #0. When the UE receives another SS block #1, the same process might take place.

In this way, information that can point forward or backward with respect to an SS block is included in the SS block and indicated to UE as the amount of shift from the SS block, so that it is possible to control the positions of control resource sets in a flexible way.

Furthermore, in subcarrier spacing (for example, the SCS of 30 kHz (FIG. 3A), 120 kHz (FIG. 4A)), at which configurations with two consecutive SS blocks are used, X and Y may be calculated from following equations 4 and 5 (see FIG. 11B):

$$X = 4 + (4 - \text{duration of control resource set}) \times (\text{SS block index mod} 2) \quad \text{(Equation 4)}$$

$$Y = 5 - (4 - \text{duration of control resource set}) \times (\text{SS block index mod} 2) \quad \text{(Equation 5)}$$

FIG. 11B shows a case where two consecutive SS blocks are provided, and where X=4 and Y=5 hold in the first SS block, and X=6 and Y=3 hold in the second SS block. For example, if the UE receives SS block #0 and X or Y is indicated in the NR-PBCH contained in SS block #0, the UE identifies the relative position from SS block #0 based on equation 4 or 5 above. Then, the reception of RMSI is controlled on assumption that the control resource set is transmitted in that relative position with respect to this SS block #0. When the UE receives other SS blocks #1 to #3, the same process might take place.

In this way, information that can point forward or backward with respect to an SS block is included in the SS block and indicated to UE as the amount of shift from the SS block, so that it is possible to control the positions of control resource sets in a flexible way. Also, even when SS blocks continue, it is possible to arrange control resource sets adequately by determining the positions of control resource sets by taking into account the SS block indices and the duration of control resource sets.

Also, in subcarrier spacing (for example, the SCS of 240 kHz (FIG. 4B)) to use four consecutive SS blocks, X and Y may be calculated from equation 6 and equation 7 below (see FIG. 11C):

$$X = 8 + (4 - \text{duration of control resource set}) \times (\text{SS block index mod} 4) \quad \text{(Equation 6)}$$

$$Y = 13 - (4 - \text{duration of control resource set}) \times (\text{SS block index mod} 4) \quad \text{(Equation 7)}$$

In FIG. 11C, the first SS block of the four consecutive SS blocks represents the case of X=8 and Y=13, the second SS block represents the case of X=10 and Y=11, the third SS block represents the case of X=12 and Y=9, and the fourth SS block represents the case of X=14 and Y=7. For example, if the UE receives SS block #0 and X or Y is indicated in the NR-PBCH contained in SS block #0, the UE identifies the relative position from SS block #0 based on equation 6 or 7 above. Then, the reception of RMSI is controlled on assumption that the control resource set is transmitted in that relative position with respect to SS block #0. When the UE receives other SS blocks #1 to #7, the same process might take place.

In this way, even when SS blocks continue, the position of the control resource set is determined by looking at the SS block index and the duration of the control resource set, so that control resource sets can be arranged adequately.

Note that equations 2 to 7 for determining X and Y are not limited to the above settings. X and Y may be determined based on other numerical values or parameters.

Also, SX, SY and S3 may be all configured as start positions in the above-described tables (for example, FIG. 8), or information of SX, SY or S3 may be indicated to UE without using a table. Also, only SX and SY may be configured in a table, or only SY and S3 may be configured in a table. Note that, instead of S3 (or in addition to S3), information to represent other positions (S2, for example) may be configured in a table.

In this way, positions pertaining to control resource sets are indicated by using multiple options (information to point forward in the time direction with respect to an SS block, information to point backward in the time direction, or other information), so that, even when the NR-PBCH payload is limited, the arrangement of control resource sets can be controlled in a flexible way.

(Third Aspect)

A third aspect of the present invention is configured so that different control resource set configurations are indicated in each SS block (NR-PBCH) depending on what frequency band is used to transmit that SS block. A case will be illustrated with the following description where different control resource set configurations (for example, different tables) are used for bands lower than 6 GHz (first band) and for bands equal to or higher than 6 GHz (second band).

For example, the number of bits and/or contents used to indicate control resource set configurations may be configured to vary between the first band and the second band. Now, a case will be described below where different numbers of bits are used to indicate the control resource set configurations for the first band and for the second band.

For example, in an SS block where the first band is used, control resource set configuration is indicated using four bits of bit information, and, in an SS block where the second band is used, the control resource set configuration is indicated using twelve bits of bit information. Note that it is only necessary to apply a large number of bits to the second band, at least compared to the first band, and the number of bits is not limited to these.

FIGS. 9A and 9B and FIG. 10 show examples of tables (third table) for use for indicating control resource configurations in the second band. Note that the third table represents the case in which control resource set configurations are indicated using twelve bits of bit information. Note that the table described earlier with respect to the first aspect (for example, FIGS. 5A and 5B) can be used as the table for indicating control resource configurations in the first band.

FIG. 9A shows a table in which the bandwidths and durations of control resource sets are defined using three bits. In addition, FIG. 9B shows a table in which the start positions of control resource sets are defined using four bits. In addition, FIG. 10 shows a table in which the start positions of control resource sets are defined using five bits.

In FIG. 9A, the bandwidth of control resource sets is defined to be 24 PRBs, 48 PRBs, 96 PRBs or 154 PRBs. In addition, the duration of control resource sets is defined to be one to three symbols. In FIG. 9B, the start position of control resource sets is defined to be one of SB 2, SB 4, SB 6, SB 8, SB 10, SB 12, SB 14, ST 1, ST 3, SN 1, SA 3, SA 5, SA 7, SA 9, SA 11 and SA 13.

To represent the start position of a control resource set, SBX is the OFDM symbol that is located X OFDM symbols before the SS block. For example, SB 2 points to the OFDM symbol that is located two OFDM symbols before the SS block. STX points to the X-th OFDM symbol in the SS block. For example, ST 1 points to the first OFDM symbol in the SS block. SN 1 points to the next OFDM symbol after the SS block. SAX is the X-th OFDM symbol after the SS block. For example, SA 2 points to the second OFDM symbol after the SS block.

As for the start positions of control resource sets, the configuration described in the second aspect may be applied.

In FIG. 10, either the same center frequency (F) as that of the SS block or the offset value (the number of PRBs) from this center frequency (F) of the SS block is defined as the frequency position of the control resource set. Predetermined numbers of PRBs (for example, +12, +24, +36 . . . , +180, −12, −24, −36, . . . , −180) may be configured as offset values.

In this way, the offset from the frequency position (the center frequency) of each SS block is indicated to the UE as the frequency position of the control resource set indicated in that SS block, so that it is possible to control the frequency positions of control resource sets in a flexible way. By this means, it is possible to indicate common control resource sets from different SS blocks.

In this way, the number of patterns of control resource set configurations to indicate in each SS block is changed based on the frequency band, so that it is possible to control the configurations of control resource sets in a flexible way, depending on the communicating environment. For example, when applying the second band (such as high frequency band), a configuration may be used that can indicate more control resource set configurations than when the first band is used. This enables flexible operation, such as indicating common control resource set configurations from different NR-PBCHs, in a high frequency band where multi-beam operation is applied.

(Variations)

The first aspect and the second aspect may be appropriately combined and applied. For example, the above-described first aspect may be designed so that, in the event a given bandwidth (for example, 6 GHz or above) is in use, the frequency position (for example, the frequency offset) of control resource sets is indicated to the UE.

For example, when the first SCS is used, the first table (see, for example, FIG. 5A) and bit information to correspond to the first table may be used, and, when the second SCS is used, the second table (see, for example, FIG. 6, FIG. 7 or FIG. 8) and bit information to correspond to the second table may be used. Also, when, in each SCS, an SS block is transmitted using a predetermined bandwidth (for example, 6 GHz or above), bit information (see, for example, FIG. 10) to indicate the frequency position (for example, the frequency offset) of the control resource set may be additionally indicated to UE.

By this means, the configurations of control resource sets can be controlled flexibly, taking into account the SCS and the frequency band that are used to transmit SS blocks.

Note that the tables described with the present embodiment, in which control resource set configurations are set forth, may be defined in advance in the specification, or may be configured from a base station to UE by using downlink control information and/or higher layer signaling (for example, RRC signaling and/or broadcast information).

(Radio Communication System)

Now, the structure of the radio communication system according to one embodiment of the present invention will be described below. In this radio communication system, communication is performed using one or a combination of the herein-contained embodiments of the present invention.

Figure 12:
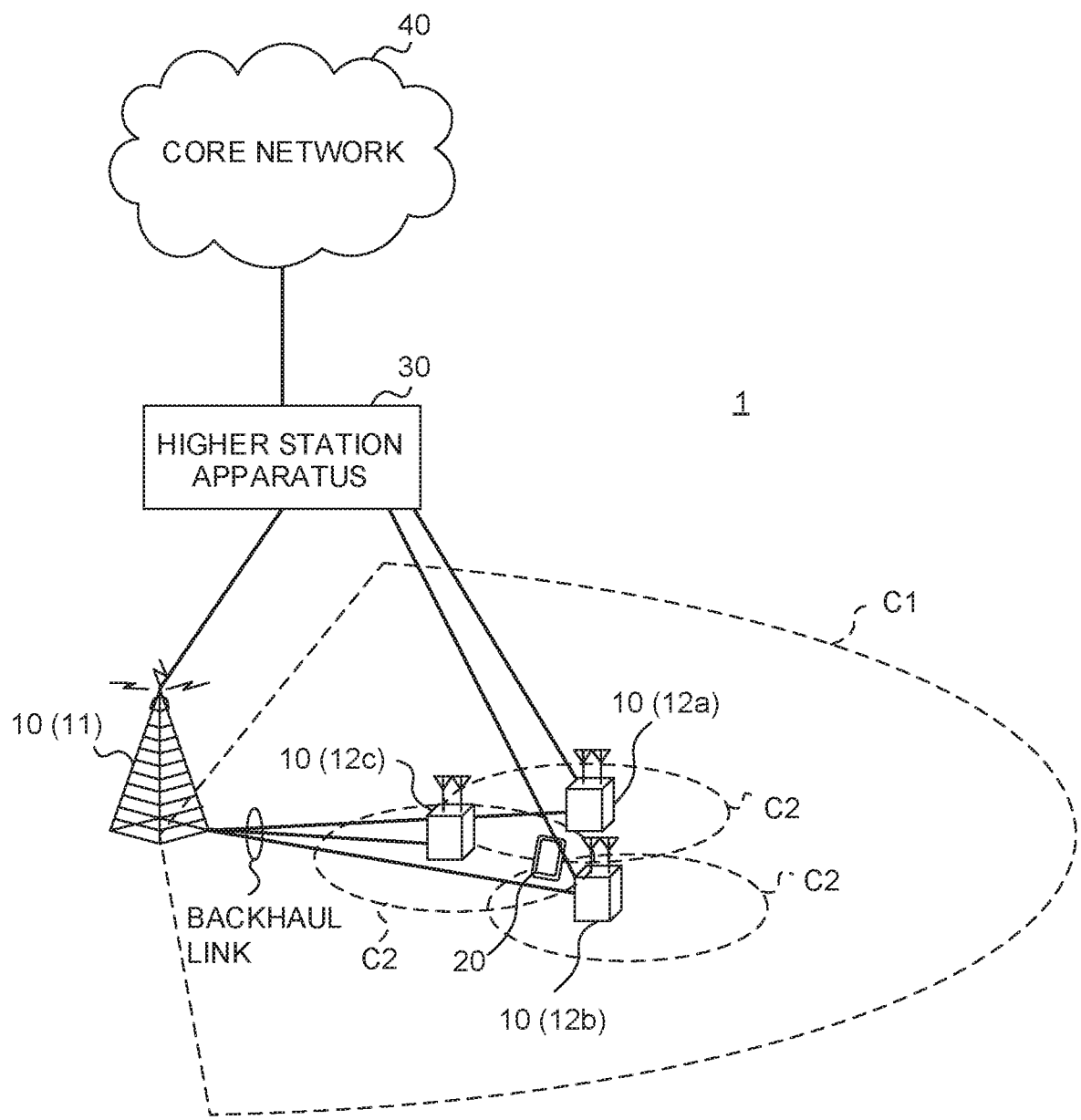
FIG. 12 is a diagram to show an example of a schematic structure of a radio communication system according to one embodiment of the present invention.

FIG. 12 is a diagram to show an example of a schematic structure of a radio communication system according to one embodiment of the present invention. A radio communication system 1 can adopt carrier aggregation (CA) and/or dual connectivity (DC) to group a plurality of fundamental frequency blocks (component carriers) into one, where the LTE system bandwidth (for example, 20 MHz) constitutes one unit.

Note that the radio communication system 1 may be referred to as "LTE (Long Term Evolution)," "LTE-A (LTE-Advanced)," "LTE-B (LTE-Beyond)," "SUPER 3G," "IMT-Advanced," "4G (4th generation mobile communication system)," "5G (5th generation mobile communication system)," "FRA (Future Radio Access)," "New-RAT (Radio Access Technology)" and so on, or may be seen as a system to implement these.

The radio communication system 1 includes a radio base station 11 that forms a macro cell C1 of a relatively wide coverage, and radio base stations 12 (12a to 12c) that are placed within the macro cell C1 and form small cells C2, which are narrower than the macro cell C1. Also, user terminals 20 are placed in the macro cell C1 and in each small cell C2.

The user terminals 20 can connect with both the radio base station 11 and the radio base stations 12. The user terminals 20 may use the macro cell C1 and the small cells C2 at the same time by means of CA or DC. Furthermore, the user terminals 20 may apply CA or DC across a plurality of cells (CCs) (for example, five or fewer CCs or six or more CCs). For example, in DC, MeNB (MCG) communicates using LTE cells, and SeNB (SCG) communicates using NR/5G cells.

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz and so on) and a wide bandwidth may be used, or the same carrier as that used in the radio base station 11 may be used. Note that the configurations of the frequency band for use in each radio base station are by no means limited to these.

A structure may be employed here in which wire connection (for example, optical fiber, which is in compliance with the CPRI (Common Public Radio Interface), the X2 interface and so on) or wireless connection is established between the radio base station 11 and the radio base station 12 (or between two radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals (mobile stations) or stationary communication terminals (fixed stations).

In the radio communication system 1, as radio access schemes, orthogonal frequency division multiple access (OFDMA) is applied to the downlink, and single-carrier frequency division multiple access (SC-FDMA) is applied to the uplink.

OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that uplink and downlink radio access schemes are not limited to the combination of these, and other radio access schemes may be used.

In the radio communication system 1, a downlink shared channel (PDSCH (Physical Downlink Shared CHannel)), which is shared by each user terminal 20, a broadcast channel (PBCH (Physical Broadcast CHannel)), downlink L1/L2 control channels and so on are used as downlink channels. User data, higher layer control information, SIBs (System Information Blocks) and so on are communicated in the PDSCH. Also, the MIB (Master Information Block) is communicated in the PBCH. A shared control channel that reports the presence or absence of a paging channel is mapped to a downlink L1/L2 control channel (for example, PDCCH), and the data of the paging channel (PCH) is mapped to the PDSCH. Downlink reference signals, uplink reference signals and physical downlink synchronization signals are arranged separately.

The downlink L1/L2 control channels include a PDCCH (Physical Downlink Control CHannel), an EPDCCH (Enhanced Physical Downlink Control CHannel), a PCFICH (Physical Control Format Indicator CHannel), a PHICH (Physical Hybrid-ARQ Indicator CHannel) and so on. Downlink control information (DCI), including PDSCH and PUSCH scheduling information, is communicated by the PDCCH. The number of OFDM symbols to use for the PDCCH is communicated by the PCFICH. HARQ (Hybrid Automatic Repeat reQuest) delivery acknowledgment information (also referred to as, for example, "retransmission control information," "HARQ-ACK," "ACK/NACK," and so forth) in response to the PUSCH is communicated by the PHICH. The EPDCCH is frequency-division-multiplexed with the PDSCH (downlink shared data channel) and used to communicate DCI and so on, like the PDCCH.

In the radio communication system 1, an uplink shared channel (PUSCH (Physical Uplink Shared CHannel)), which is shared by each user terminal 20, an uplink control channel (PUCCH (Physical Uplink Control CHannel)), a random access channel (PRACH (Physical Random Access CHannel)) and so on are used as uplink channels. User data and higher layer control information are communicated by the PUSCH. Also, downlink radio quality information (CQI (Channel Quality Indicator)), delivery acknowledgement information and so on are communicated by the PUCCH. By means of the PRACH, random access preambles for establishing connections with cells are communicated.

In the radio communication system 1, cell-specific reference signals (CRSs), channel state information reference signals (CSI-RSs), demodulation reference signals (DMRSs), positioning reference signals (PRSs) and so on are communicated as downlink reference signals. Also, in the radio communication system 1, measurement reference signals (SRS (Sounding Reference Signals)), demodulation reference signals (DMRSs) and so on are communicated as uplink reference signals. Note that DMRSs may be referred to as "user terminal-specific reference signals (UE-specific Reference Signals)." Also, the reference signals to be communicated are by no means limited to these.

(Radio Base Station)

Figure 13:
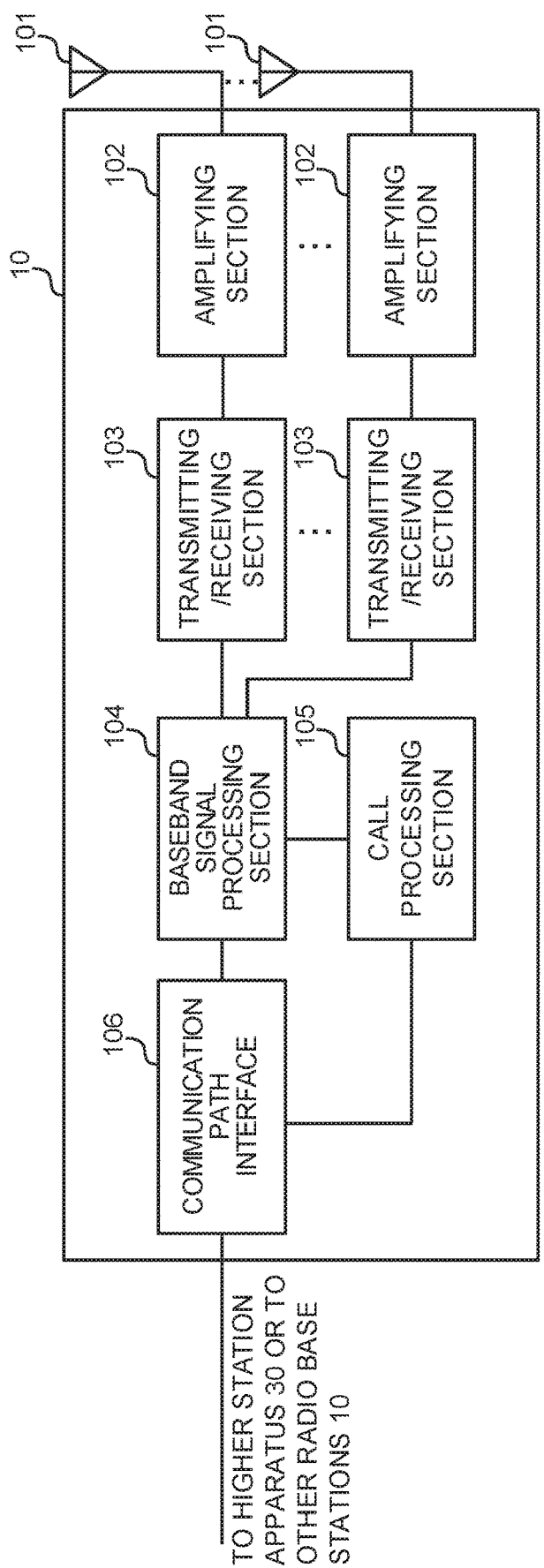
FIG. 13 is a diagram to show an example of an overall structure of a radio base station according to one embodiment of the present invention.

FIG. 13 is a diagram to show an example of an overall structure of a radio base station according to one embodiment of the present invention. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to transmission processes, including a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103. Furthermore, downlink control signals are also subjected to transmission processes such as channel coding and an inverse fast Fourier transform, and forwarded to the transmitting/receiving sections 103.

Baseband signals that are precoded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for uplink signals, radio frequency signals that are received in the transmitting/receiving antennas 101 are each amplified in the amplifying sections 102. The transmitting/receiving sections 103 receive the uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing such as setting up and releasing communication channels, manages the state of the radio base station 10 and manages the radio resources.

The communication path interface section 106 transmits and receives signals to and from the higher station apparatus 30 via a predetermined interface. Also, the communication path interface 106 may transmit and receive signals (backhaul signaling) with other radio base stations 10 via an inter-base station interface (which is, for example, optical fiber that is in compliance with the CPRI (Common Public Radio Interface), the X2 interface, etc.).

Note that the transmitting/receiving sections 103 include predetermined bit information to represents the configurations of a control resource set in an SS block (for example, the NR-PBCH) and transmit this SS block. Also, the transmitting/receiving sections 103 transmit a downlink control channel (NR-PDCCH) in the control resource set indicated in this SS block. Also, the transmitting/receiving section 103 may report a table, in which configurations of control resource sets are defined, to the UE, via higher layer signaling and/or others. In addition, the transmitting/receiving sections 103 select predetermined information, from a plurality of pieces of information (options) that indicate relative positions of the control resource set with respect to the SS block, and control transmission.

Figure 14:
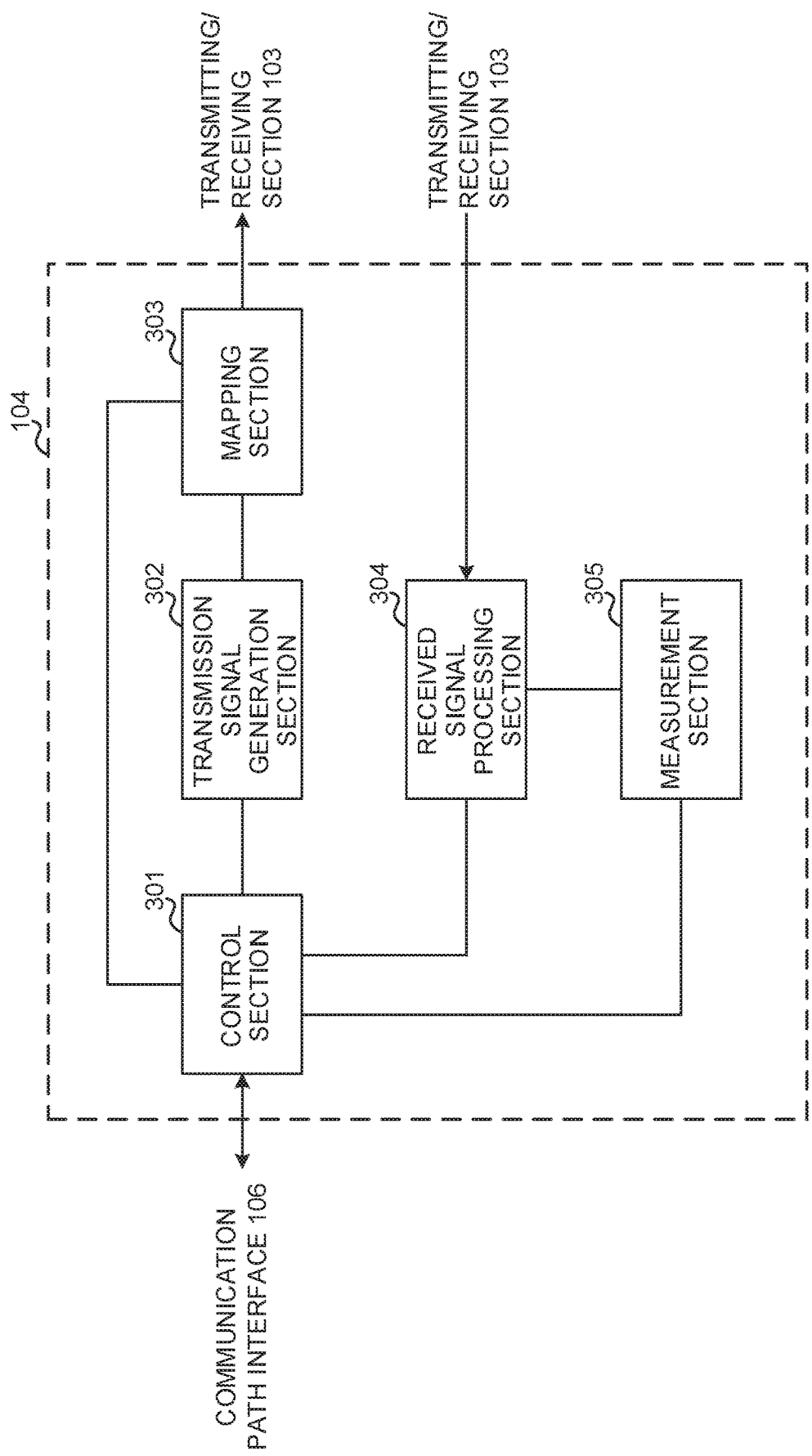
FIG. 14 is a diagram to show an example of a functional structure of a radio base station according to one embodiment of the present invention.

FIG. 14 is a diagram to show an example of a functional structure of a radio base station according to one embodiment of the present invention. Note that, although this example primarily shows functional blocks that pertain to characteristic parts of the present embodiment, the radio base station 10 has other functional blocks that are necessary for radio communication as well.

The baseband signal processing section 104 has a control section (scheduler) 301, a transmission signal generation section 302, a mapping section 303, a received signal processing section 304 and a measurement section 305. Note that these configurations have only to be included in the radio base station 10, and some or all of these configurations may not be included in the baseband signal processing section 104. The baseband signal processing section 104 has digital beamforming functions for providing digital beamforming.

The control section (scheduler) 301 controls the whole of the radio base station 10. The control section 301 can be constituted by a controller, a control circuit or control apparatus that can be described based on general understanding of the technical field to which the present invention pertains.

The control section 301 controls, for example, generation of signals in the transmission signal generation section 302 (including signals that correspond to synchronization signals, the MIB, the paging channel and the broadcast channel), allocation of signals in the mapping section 303, and so on.

The control section 301 exerts control so that predetermined bit information to represents the configurations of a control resource set is included in an SS block (for example, the NR-PBCH) and transmitted. In addition, the control section 301 exerts control so that a downlink control channel (NR-PDCCH) is transmitted in the control resource set indicated in this SS block. Furthermore, the control section 301 may select predetermined information, from a plurality of pieces of information (options) that indicate relative positions of the control resource set with respect to the SS block, and control transmission directed to user terminals.

The transmission signal generation section 302 generates downlink signals (downlink control signals, downlink data signals, downlink reference signals and so on) as commanded by the control section 301, and outputs these signals to the mapping section 303. The transmission signal generation section 302 can be constituted by a signal generator, a signal generating circuit or signal generating apparatus that can be described based on general understanding of the technical field to which the present invention pertains.

For example, the transmission signal generation section 302 generates DL assignments, which indicate downlink signal allocation information, and UL grants, which indicate uplink signal allocation information, as commanded by the control section 301. Also, downlink data signals are subjected to the coding process, the modulation process and so on, by using coding rates and modulation schemes that are determined based on, for example, channel state information (CSI) from each user terminal 20.

The mapping section 303 maps the downlink signals generated in the transmission signal generation section 302 to predetermined radio resources as commanded by the control section 301, and outputs these to the transmitting/receiving sections 103. The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding and so on) of received signals that are input from the transmitting/receiving sections 103. Here, the received signals include, for example, uplink signals transmitted from the user terminals 20 (uplink control signals, uplink data signals, uplink reference signals, etc.). The received signal processing section 304 can be constituted by a signal processor, a signal processing circuit or signal processing apparatus that can be described based on general understanding of the technical field to which the present invention pertains.

The received signal processing section 304 outputs the decoded information, acquired through the receiving processes, to the control section 301. For example, when a PUCCH to contain an HARQ-ACK is received, the received signal processing section 304 outputs this HARQ-ACK to the control section 301. Also, the received signal processing section 304 outputs the received signals, the signals after the receiving processes and so on, to the measurement section 305.

The measurement section 305 conducts measurements with respect to the received signals. The measurement section 305 can be constituted by a measurer, a measurement circuit or measurement apparatus that can be described based on general understanding of the technical field to which the present invention pertains.

When signals are received, the measurement section 305 may measure, for example, the received power (for example, RSRP (Reference Signal Received Power)), the received quality (for example, RSRQ (Reference Signal Received Quality)), the SINR (Signal to Interference plus Noise Ratio), channel states and so on of the received signals. The measurement results may be output to the control section 301.

(User Terminal)

Figure 15:
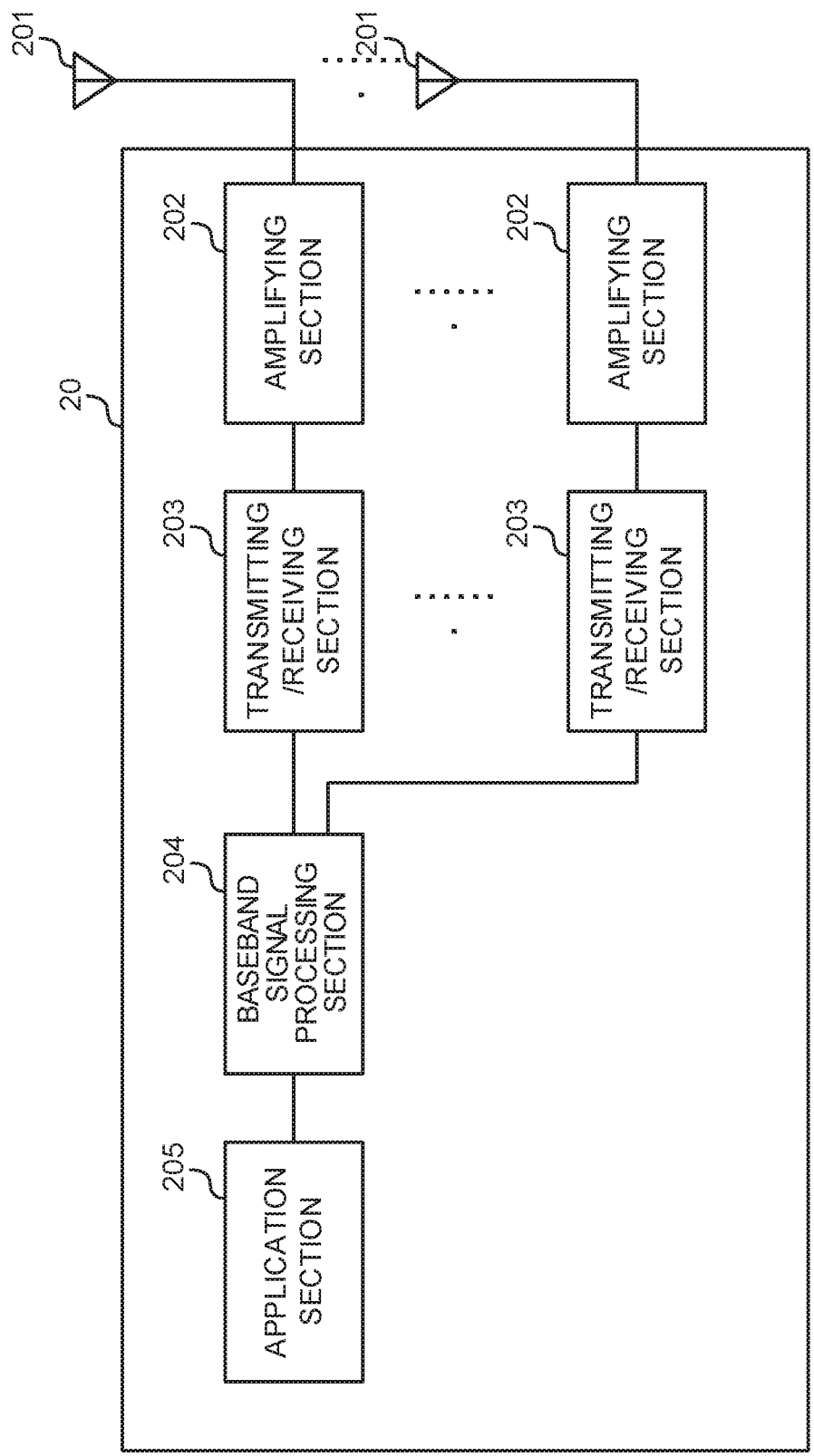
FIG. 15 is a diagram to show an example of an overall structure of a user terminal according to one embodiment of the present invention.

FIG. 15 is a diagram to show an example of an overall structure of a user terminal according to one embodiment of the present invention. A user terminal 20 has a plurality of transmitting/receiving antennas 201, amplifying sections 202, transmitting/receiving sections 203, a baseband signal processing section 204 and an application section 205. Note that one or more transmitting/receiving antennas 201, amplifying sections 202 and transmitting/receiving sections 203 may be provided.

Radio frequency signals that are received in the transmitting/receiving antennas 201 are amplified in the amplifying sections 202. The transmitting/receiving sections 203 receive the downlink signals amplified in the amplifying sections 202. The received signals are subjected to frequency conversion and converted into the baseband signal in the transmitting/receiving sections 203, and output to the baseband signal processing section 204. The transmitting/receiving sections 203 can be constituted by transmitters/receivers, transmitting/receiving circuits or transmitting/receiving apparatus that can be described based on general understanding of the technical field to which the present invention pertains. Note that a transmitting/receiving section 203 may be structured as a transmitting/receiving section in one entity, or may be constituted by a transmitting section and a receiving section.

In the baseband signal processing section 204, the baseband signal that is input is subjected to an FFT process, error correction decoding, a retransmission control receiving process, and so on. Downlink user data is forwarded to the application section 205. The application section 205 performs processes related to higher layers above the physical layer and the MAC layer, and so on. Furthermore, in the downlink data, broadcast information is also forwarded to the application section 205.

Meanwhile, uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving sections 203. Baseband signals that are output from the baseband signal processing section 204 are converted into a radio frequency band in the transmitting/receiving sections 203 and transmitted. The radio frequency signals that are subjected to frequency conversion in the transmitting/receiving sections 203 are amplified in the amplifying sections 202, and transmitted from the transmitting/receiving antennas 201.

Note that the transmitting/receiving sections 203 may furthermore have an analog beamforming section that forms analog beams. The analog beamforming section may be constituted by an analog beamforming circuit (for example, a phase shifter, a phase shifting circuit, etc.) or analog beamforming apparatus (for example, a phase shifting device) that can be described based on general understanding of the technical field to which the present invention pertains. Furthermore, the transmitting/receiving antennas 201 may be constituted by, for example, array antennas.

The transmitting/receiving sections 203 receive an SS block (for example, NR-PBCH), which contains predetermined bit information to represents the configurations of a control resource set. Also, the transmitting/receiving sections 203 receive a downlink control channel (NR-PDCCH) in the control resource set indicated in this SS block. In addition, the transmitting/receiving sections 203 may receive a table, in which control resource set configurations are set forth, via higher layer signaling and so on. Also, the transmitting/receiving sections 203 receive predetermined information, which is selected by the base station from a plurality of pieces of information (options) that represents the relative position of the control resource set with respect to this SS block.

Figure 16:
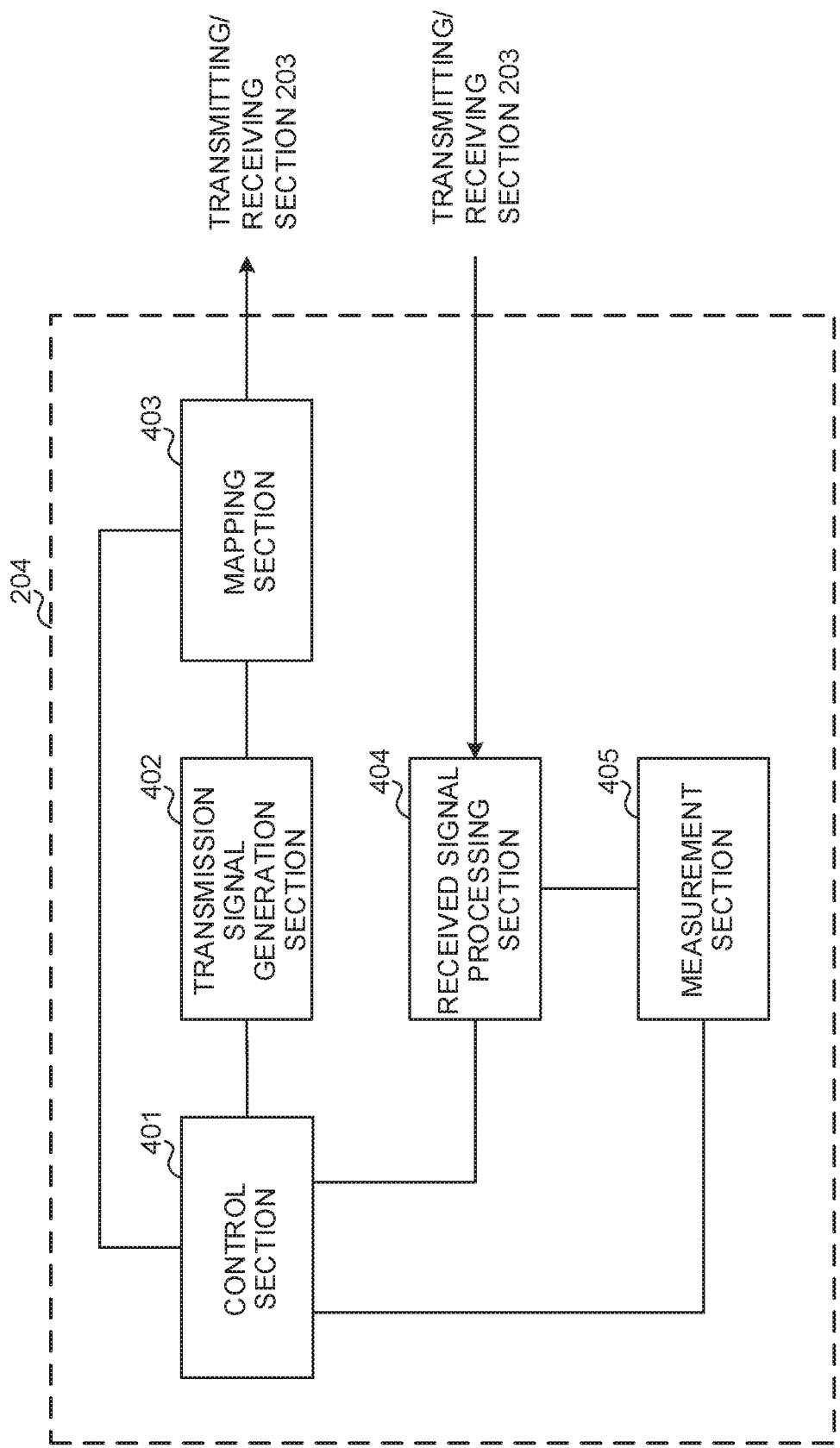
FIG. 16 is a diagram to show an example of a functional structure of a user terminal according to one embodiment of the present invention.

FIG. 16 is a diagram to show an example of a functional structure of a user terminal according to one embodiment of the present invention. Note that, although this example primarily shows functional blocks that pertain to characteristic parts of the present embodiment, the user terminal 20 has other functional blocks that are necessary for radio communication as well.

The baseband signal processing section 204 provided in the user terminal 20 at least has a control section 401, a transmission signal generation section 402, a mapping section 403, a received signal processing section 404 and a measurement section 405. Note that these configurations have only to be included in the user terminal 20, and some or all of these configurations may not be included in the baseband signal processing section 204.

The control section 401 controls the whole of the user terminal 20. The control section 401 can be constituted by a controller, a control circuit or control apparatus that can be described based on general understanding of the technical field to which the present invention pertains.

The control section 401 controls, for example, generation of signals in the transmission signal generation section 402, allocation of signals in the mapping section 403, and so on. Furthermore, the control section 401 controls the signal receiving processes in the received signal processing section 404, and the measurements of signals in the measurement section 405.

The control section 401 determines the relative position of the control resource set with respect to the SS block based on predetermined bit information, and controls the receipt of the downlink control channel. For example, the control section 401 calculates candidate amounts of shift (X and/or Y) in the forward and backward directions of the SS block in the time direction, based on predetermined bit information (for example, a bit to specify X or Y). In this case, the control section 401 may determine a plurality of candidate amounts of shift by using a predetermined equation. Also, the equation to use to calculate the amount of shift may be defined differently depending on subcarrier spacing or SS block configuration (for example, the number of SS blocks in a row, etc.).

The candidate positions of the control resource set, indicated by means of predetermined bit information, may be defined in the table, and, as candidate positions for the control resource set, at least the amount of shift in the forward direction of the SS block in the time direction, the amount of shift in the backward direction of the SS block in the time direction, and information that represents a specific symbol may be defined in the table.

The control section 401 judges the content of the predetermined bit information (for example, the table used) included in the SS block (for example, the NR-PBCH) based on the subcarrier spacing and/or the frequency band that is used to transmit the SS block, and control the receipt of the downlink control channel. For example, the control section 401 looks up different tables depending on the subcarrier spacing and/or the frequency band that are used to transmit the SS block to determine the content of the predetermined bit information.

For example, a first table is applied to the first subcarrier spacing (15/30/60/120 kHz), and a second table is applied to second subcarrier spacing (240 kHz). Alternatively, different tables are applied between the first frequency band (for example, lower than 6 GHz) and a second frequency band (for example, 6 GHz or above).

For example, in these different tables, at least different numbers of patterns of control resource set start positions are set forth. Also, the number of bits to constitute the bit information may vary depending on the subcarrier spacing and/or the frequency band used to transmit the SS block. In at least one of these different tables, the start positions of control resource sets may be defined using SS block indices.

The transmission signal generation section 402 generates uplink signals (uplink control signals, uplink data signals, uplink reference signals, etc.) as commanded by the control section 401, and outputs these signals to the mapping section 403. The transmission signal generation section 402 can be constituted by a signal generator, a signal generating circuit or signal generating apparatus that can be described based on general understanding of the technical field to which the present invention pertains.

For example, the transmission signal generation section 402 generates uplink control signals related to delivery acknowledgement information, channel state information (CSI) and so on, as commanded by the control section 401. Also, the transmission signal generation section 402 generates uplink data signals as commanded by the control section 401. For example, when a UL grant is included in a downlink control signal that is indicated from the radio base station 10, the control section 401 commands the transmission signal generation section 402 to generate an uplink data signal.

The mapping section 403 maps the uplink signals generated in the transmission signal generation section 402 to radio resources as commanded by the control section 401, and outputs the result to the transmitting/receiving sections 203. The mapping section 403 can be constituted by a mapper, a mapping circuit or mapping apparatus that can be described based on general understanding of the technical field to which the present invention pertains.

The received signal processing section 404 performs receiving processes (for example, demapping, demodulation, decoding and so on) of received signals that are input from the transmitting/receiving sections 203. Here, the received signals include, for example, downlink signals (downlink control signals, downlink data signals, downlink reference signals and so on) that are transmitted from the radio base station 10. The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

As commanded by the control section 401, the received signal processing section 404 receives synchronization signals and a broadcast channel, which the radio base station transmits by applying beamforming. In particular, the received signal processing section 404 receives the synchronization signals and the broadcast channel that are allocated to at least one of a plurality of time fields (for example, symbols) constituting a predetermined transmission time interval (for example, a subframe or a slot).

The received signal processing section 404 outputs the decoded information, acquired through the receiving processes, to the control section 401. The received signal processing section 404 outputs, for example, broadcast information, system information, RRC signaling, DCI and so on, to the control section 401. Also, the received signal processing section 404 outputs the received signals, the signals after the receiving processes and so on, to the measurement section 405.

The measurement section 405 conducts measurements with respect to the received signals. For example, the measurement section 405 performs measurements using the beamforming RS transmitted from the radio base station 10. The measurement section 405 can be constituted by a measurer, a measurement circuit or measurement apparatus that can be described based on general understanding of the technical field to which the present invention pertains.

The measurement section 405 may measure, for example, the received power (for example, RSRP), the received quality (for example, RSRQ, received SINR), the channel states and so on of the received signals. The measurement results may be output to the control section 401. For example, the measurement section 405 performs RRM measurements using synchronization signals.

(Hardware Structure)

Note that the block diagrams that have been used to describe the above embodiments show blocks in functional units. These functional blocks (components) may be implemented in arbitrary combinations of hardware and/or software. Also, the means for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire or wireless, for example) and using these multiple pieces of apparatus.

Figure 17:
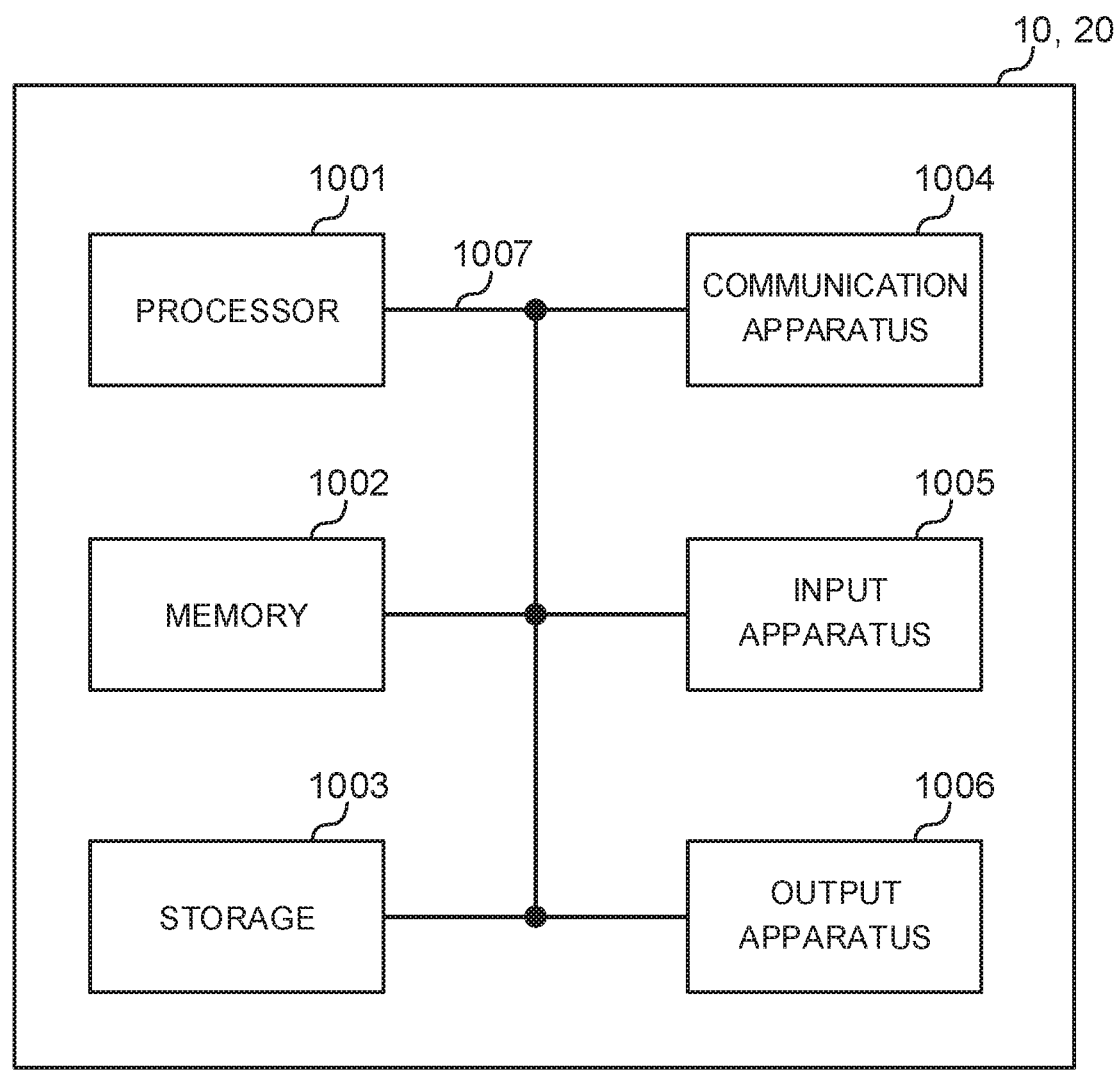
FIG. 17 is a diagram to show an example hardware structure of a radio base station and a user terminal according to one embodiment of the present invention.

For example, the radio base station, user terminals and so on according to embodiments of the present invention may function as a computer that executes the processes of the radio communication method of the present invention. FIG. 17 is a diagram to show an example hardware structure of a radio base station and a user terminal according to an embodiment of the present invention. Physically, the above-described radio base stations 10 and user terminals 20 may be formed as computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus shown in the drawing, or may be designed not to include part of the apparatus.

For example, although only one processor 1001 is shown, a plurality of processors may be provided. Furthermore, processes may be implemented with one processor, or processes may be implemented in sequence, or in different manners, on one or more processors. Note that the processor 1001 may be implemented with one or more chips.

Each function of the radio base station 10 and the user terminal 20 is implemented by reading predetermined software (program) on hardware such as the processor 1001 and the memory 1002, and by controlling the calculations in the processor 1001, the communication in the communication apparatus 1004, and the reading and/or writing of data in the memory 1002 and the storage 1003.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and others may be implemented by the processor 1001.

Furthermore, the processor 1001 reads programs (program codes), software modules, data and so forth from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," a "cache," a "main memory (primary storage apparatus)" and so on. The memory 1002 can store executable programs (program codes), software modules and so on for implementing the radio communication methods according to embodiments of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving device) for allowing inter-computer communication by using wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an LED (Light Emitting Diode) lamp and so on). Note that the input apparatus 1005 and the output apparatus 1006 may be provided in an integrated structure (for example, a touch panel).

Furthermore, each apparatus, including the processor 1001 and/or the memory 1002, is connected via a bus 1007 for communicating information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

(Variations)

Note that the terminology used in this specification and the terminology that is needed to understand this specification may be replaced by other terms that convey the same or similar meanings. For example, "channels" and/or "symbols" may be replaced by "signals (or "signaling")." Also, "signals" may be "messages." A reference signal may be abbreviated as an "RS," and may be referred to as a "pilot," a "pilot signal" and so on, depending on which standard applies. Furthermore, a "component carrier (CC)" may be referred to as a "cell," a "frequency carrier," a "carrier frequency" and so on.

Furthermore, a radio frame may be comprised of one or more periods (frames) in the time domain. Each of one or more periods (frames) constituting a radio frame may be referred to as a "subframe." Furthermore, a subframe may be comprised of one or more slots in the time domain. Furthermore, a slot may be comprised of one or more symbols in the time domain (OFDM (Orthogonal Frequency Division Multiplexing) symbols, SC-FDMA (Single Carrier Frequency Division Multiple Access) symbols, and so on).

A radio frame, a subframe, a slot and a symbol all represent the time unit in signal communication. A radio frame, a subframe, a slot and a symbol may be each called by other applicable names. For example, one subframe may be referred to as a "transmission time interval (TTI)," a plurality of consecutive subframes may be referred to as a "TTI," or one slot may be referred to as a "TTI." That is, a subframe and/or a TTI may be a subframe (1 ms) in existing LTE, may be a shorter period than 1 ms (for example, one to thirteen symbols), or may be a longer period of time than 1 ms.

Here, a TTI refers to the minimum time unit of scheduling in radio communication, for example. For example, in LTE systems, a radio base station schedules the allocation of radio resources (such as the frequency bandwidth and/or the transmission power that can be used by each user terminal) for each user terminal in TTI units. Note that the definition of TTIs is not limited to this. TTIs may be transmission time units for channel-encoded data packets (transport blocks), or may be the unit of processing in scheduling, link adaptation and so on.

A TTI having a time duration of 1 ms may be referred to as a "normal TTI (TTI in LTE Rel. 8 to 12)," a "long TTI," a "normal subframe," a "long subframe," and so on. A TTI that is shorter than a normal TTI may be referred to as a "shortened TTI," a "short TTI," a "shortened subframe," a "short subframe," and so on.

A resource block (RB) is the unit of resource allocation in the time domain and the frequency domain, and may include one or a plurality of consecutive subcarriers in the frequency domain. Also, an RB may include one or more symbols in the time domain, and may be one slot, one subframe or one TTI in length. One TTI and one subframe each may be comprised of one or more resource blocks. Note that an RB may be referred to as a "physical resource block (PRB (Physical RB))," a "PRB pair," an "RB pair," and so on.

Furthermore, a resource block may be comprised of one or more resource elements (REs). For example, one RE may be a radio resource field of one subcarrier and one symbol.

Note that the above-described structures of radio frames, subframes, slots, symbols and so on are merely examples. For example, configurations such as the number of subframes included in a radio frame, the number of slots included in a subframe, the number of symbols and RBs included in a slot, the number of subcarriers included in an RB, the number of symbols in a TTI, the symbol duration and the cyclic prefix (CP) duration can be variously changed.

Also, the information and parameters described in this specification may be represented in absolute values or in relative values with respect to predetermined values, or may be represented in other information formats. For example, radio resources may be specified by predetermined indices. In addition, equations to use these parameters and so on may be used, apart from those explicitly disclosed in this specification.

The names used for parameters and so on in this specification are in no respect limiting. For example, since various channels (PUCCH (Physical Uplink Control CHannel), PDCCH (Physical Downlink Control CHannel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and/or output via a plurality of network nodes.

The information, signals and so on that are input and/or output may be stored in a specific location (for example, a memory), or may be managed using a management table. The information, signals and so on to be input and/or output can be overwritten, updated or appended. The information, signals and so on that are output may be deleted. The information, signals and so on that are input may be transmitted to other pieces of apparatus.

Reporting of information is by no means limited to the aspects/embodiments described in this specification, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (the master information block (MIB), system information blocks (SIBs) and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)" and so on. Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

Also, reporting of predetermined information (for example, reporting of information to the effect that "X holds") does not necessarily have to be sent explicitly, and can be sent implicitly (by, for example, not reporting this piece of information).

Decisions may be made in values represented by one bit (0 or 1), may be made in Boolean values that represent true or false, or may be made by comparing numerical values (for example, comparison against a predetermined value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are also included in the definition of communication media.

The terms "system" and "network" as used herein are used interchangeably.

As used herein, the terms "base station (BS)," "radio base station," "eNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or more (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part or all of the coverage area of a base station and/or a base station subsystem that provides communication services within this coverage.

As used herein, the terms "mobile station (MS)" "user terminal," "user equipment (UE)" and "terminal" may be used interchangeably. A base station may be referred to as a "fixed station," "NodeB," "eNodeB (eNB)," "access point," "transmission point," "receiving point," "femto cell," "small cell" and so on.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client" or some other suitable terms.

Furthermore, the radio base stations in this specification may be interpreted as user terminals. For example, each aspect/embodiment of the present invention may be applied to a configuration in which communication between a radio base station and a user terminal is replaced with communication among a plurality of user terminals (D2D (Device-to-Device)). In this case, user terminals 20 may have the functions of the radio base stations 10 described above. In addition, words such as "uplink" and/or "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

Certain actions which have been described in this specification to be performed by base stations may, in some cases, be performed by higher nodes (upper nodes). In a network comprised of one or more network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The aspects/embodiments illustrated in this specification may be used individually or in combinations, which may be switched depending on the mode of implementation. The order of processes, sequences, flowcharts and so on that have been used to describe the aspects/embodiments herein may be re-ordered as long as inconsistencies do not arise. For example, although various methods have been illustrated in this specification with various components of steps in exemplary orders, the specific orders that are illustrated herein are by no means limiting.

The aspects/embodiments illustrated in this specification may be applied to systems that use LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR (New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark) and other adequate radio communication methods, and/or next-generation systems that are enhanced based on these.

The phrase "based on" as used in this specification does not mean "based only on," unless otherwise specified. In other words, the phrase "based on" means both "based only on" and "based at least on."

Reference to elements with designations such as "first," "second" and so on as used herein does not generally limit the number/quantity or order of these elements. These designations are used herein only for convenience, as a method of distinguishing between two or more elements. In this way, reference to the first and second elements does not imply that only two elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure), ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between two or more elements, and may include the presence of one or more intermediate elements between two elements that are "connected" or "coupled" to each other. The coupling or connection between the elements may be physical, logical or a combination of these. As used herein, two elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in the radio frequency, microwave and optical regions (both visible and invisible).

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

(Additional Notes)

Now, supplementary notes on the present disclosure will follow below.

[Configuration 1]

A user terminal comprising a receiving section that receives a synchronization signal (SS) block, which contains predetermined bit information representing a configuration of a control resource set, and a control section that determines the relative position of the control resource set with respect to the SS block based on the predetermined bit information, and controls receipt of a downlink control channel.

[Configuration 2]

The user terminal according to configuration 1, in which the control section calculates a candidate amount of shift in forward and backward directions in the time direction with respect to the SS block, based on the predetermined bit information.

[Configuration 3]

The user terminal according to configuration 1 or configuration 2, in which the control section determines a plurality of candidate amounts of shift by using a predetermined equation.

[Configuration 4]

The user terminal according to configuration 3, in which the equation to use to calculate the amounts of shift is defined differently depending on subcarrier spacing or an SS block configuration.

[Configuration 5]

The user terminal according to one of configuration 1 to configuration 4, in which candidate positions of the control resource set indicated by means of the predetermined bit information is defined in the table, and at least the amount of shift in the forward direction of the SS block in the time direction, the amount of shift in the backward direction of the SS block in the time direction, and information to represent specific symbols are set forth in the table, as the candidate positions of the control resource set.

[Configuration 6]

A base station comprising a transmission section that transmits a synchronization signal (SS) block, which contains predetermined bit information representing a configuration of a control resource set, and a control section that selects a predetermined piece of information from a plurality of pieces of information indicating relative positions of the control resource set with respect to the SS block, and controls transmission directed to a user terminal.

[Configuration 7]

A radio communication method for a user terminal, comprising the steps of receiving a synchronization signal (SS) block, which contains predetermined bit information representing a configuration of a control resource set, and determining the relative position of the control resource set with respect to the SS block based on the predetermined bit information, and controlling receipt of a downlink control channel.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The disclosure of Japanese Patent Application No. 2017-196411, filed on Sep. 20, 2017, including the specification, drawings and abstract, is incorporated herein by reference in its entirety.

The invention claimed is:

1. A terminal comprising:
 a receiver that receives a synchronization signal/physical broadcast channel block (SS/PBCH block) including information that indicates a configuration of a control resource set; and
 a processor that determines a position of the control resource set relative to the SS/PBCH block based on the information,
 wherein the processor applies different association information in a first frequency band and a second frequency band, the association information defining a symbol at a start position of the control resource set using an SS/PBCH block index for at least a part of a plurality of start position candidates of the control resource set indicated by the information.

2. The terminal according to claim 1, wherein the processor determines the symbol at a start position of the control resource set with consideration of a SS/PBCH block index.

3. The terminal according to claim 2, wherein the processor controls a reception of a downlink control channel based on information about different start position candidates for the control resource set.

4. The terminal according to claim 2, wherein candidates of the configuration of the control resource set are defined differently in accordance with a subcarrier spacing of the SS/PBCH block.

5. The terminal according to claim 1, wherein the processor controls a reception of a downlink control channel based on information about different start position candidates for the control resource set.

6. The terminal according to claim 5, wherein the information includes, as the plurality of start position candidates of the control resource set, a specific symbol and a symbol that is specified based on a control resource set duration and an SS/PBCH block index, wherein each candidate includes the specific symbol or the symbol that is specified based on the control resource set duration and the SS/PBCH block index.

7. The terminal according to claim 6, wherein the control resource set duration is defined as a number of symbols.

8. The terminal according to claim 1, wherein candidates of the configuration of the control resource set are defined differently in accordance with a subcarrier spacing of the SS/PBCH block.

9. The terminal according to claim 1, wherein the association information is a table.

10. A terminal comprising:
 a receiver that receives a synchronization signal/physical broadcast channel block (SS/PBCH block) including information that indicates a configuration of a control resource set; and
 a processor that controls reception of a downlink control channel based on a symbol at a start position of the control resource set,
 wherein the processor determines the symbol in accordance with the information and the SS/PBCH block by applying different association information in a first frequency band and a second frequency band, the association information defining the symbol at the start position of the control resource set using an SS/PBCH block index for at least a part of a plurality of start position candidates of the control resource set indicated by the information.

11. The terminal according to claim 10, wherein the processor determines the symbol at the start position of the control resource set with consideration of a SS/PBCH block index.

12. The terminal according to claim 10, wherein the processor controls a reception of the downlink control channel based on information about different start position candidates for the control resource set.

13. The terminal according to claim 10, wherein candidates of the configuration of the control resource set are defined differently in accordance with a subcarrier spacing of the SS/PBCH block.

14. The terminal according to claim 10, wherein the association information is a table.

15. A radio communication method for a terminal comprising:
receiving a synchronization signal block/physical broadcast channel (SS/PBCH block) including information that indicates a configuration of a control resource set; and
determining a position of the control resource set relative to the SS/PBCH block based on the information by applying different association information in a first frequency band and a second frequency band, the association information defining a symbol at a start position of the control resource set using an SS/PBCH block index for at least a part of a plurality of start position candidates of the control resource set indicated by the information.

16. A base station comprising:
a transmitter that transmits a synchronization signal/physical broadcast channel block (SS/PBCH block) including information that indicates a configuration of a control resource set; and
a processor that controls a position of the control resource set relative to the SS/PBCH block determined based on the information by applying different association information in a first frequency band and a second frequency band, the association information defining a symbol at a start position of the control resource set using an SS/PBCH block index for at least a part of a plurality of start position candidates of the control resource set indicated by the information.

17. A radio communication method for a terminal comprising:
receiving a synchronization signal/physical broadcast channel block (SS/PBCH block) including information that indicates a configuration of a control resource set; and
controlling reception of a downlink control channel based on a symbol at a start position of the control resource set,
wherein the symbol is determined in accordance with the information and the SS/PBCH block, by applying different association information in a first frequency band and a second frequency band, the association information defining the symbol at the start position of the control resource set using an SS/PBCH block index for at least a part of a plurality of start position candidates of the control resource set indicated by the information.

18. A base station comprising:
a transmitter that transmits a synchronization signal/physical broadcast channel block (SS/PBCH block) including information that indicates a configuration of a control resource set; and
a processor that controls transmission of a downlink control channel based on a symbol at a start position of the control resource set,
wherein the symbol is determined in accordance with the information and the SS/PBCH block, by applying different association information in a first frequency band and a second frequency band, the association information defining the symbol at the start position of the control resource set using an SS/PBCH block index for at least a part of a plurality of start position candidates of the control resource set indicated by the information.

19. A system comprising:
a terminal comprising:
a receiver that receives a synchronization signal/physical broadcast channel block (SS/PBCH block) including information that indicates a configuration of a control resource set; and
a processor that determines a position of the control resource set relative to the SS/PBCH block based on the information,
wherein the processor applies different association information in a first frequency band and a second frequency band, the association information defining a symbol at a start position of the control resource set using an SS/PBCH block index for at least a part of a plurality of start position candidates of the control resource set indicated by the information, and
a base station comprising:
a transmitter that transmits the SS/PBCH block; and
a processor that controls the position.

20. A system comprising:
a terminal comprising:
a receiver that receives a synchronization signal/physical broadcast channel block (SS/PBCH block) including information that indicates a configuration of a control resource set; and
a processor that controls reception of a downlink control channel based on a symbol at a start position of the control resource set,
wherein the processor determines the symbol in accordance with the information and the SS/PBCH block by applying different association information in a first frequency band and a second frequency band, the association information defining the symbol at the start position of the control resource set using an SS/PBCH block index for at least a part of a plurality of start position candidates of the control resource set indicated by the information, and
a base station comprising:
a transmitter that transmits the SS/PBCH block; and
a processor that controls transmission of the downlink control channel.

* * * * *